(12) United States Patent
Pell

(10) Patent No.: US 12,429,301 B2
(45) Date of Patent: Sep. 30, 2025

(54) AR/VR CROSSBOW SYSTEM

(71) Applicant: ACCUBOW LLC, Peru, IL (US)

(72) Inventor: Matthew Allen-Tesch Pell, Peru, IL (US)

(73) Assignee: AccuBow LLC, Peru, IL (US)

( * ) Notice: Subject to any disclaimer, the term of this patent is extended or adjusted under 35 U.S.C. 154(b) by 0 days.

(21) Appl. No.: 18/927,100

(22) Filed: Oct. 25, 2024

(65) Prior Publication Data

US 2025/0044054 A1    Feb. 6, 2025

Related U.S. Application Data

(63) Continuation of application No. PCT/US2023/020538, filed on May 1, 2023.
(Continued)

(51) Int. Cl.
| | | |
|---|---|---|
| *A63F 13/837* | (2014.01) | |
| *F41B 5/14* | (2006.01) | |
| *F41G 1/467* | (2006.01) | |

(52) U.S. Cl.
CPC .......... *F41B 5/1476* (2013.01); *A63F 13/837* (2014.09); *F41G 1/467* (2013.01)

(58) Field of Classification Search
CPC .... F41B 5/12; F41B 5/123; F41B 5/14; F41B 5/1476; F41B 5/1492; A63F 13/837; A63F 2300/8076; A63B 2244/04; F41G 1/467

(Continued)

(56) References Cited

U.S. PATENT DOCUMENTS

| | | |
|---|---|---|
| 2,496,140 A | 1/1950 | Virneburg |
| 2,929,372 A | 3/1960 | Vance |
| | (Continued) | |

FOREIGN PATENT DOCUMENTS

| | | |
|---|---|---|
| CN | 207941185 U | 10/2018 |
| DE | 202007002080 U1 | 4/2007 |
| | (Continued) | |

OTHER PUBLICATIONS

Techniq Archery Training Device, Apr. 2014.
(Continued)

*Primary Examiner* — Alexander R Niconovich
(74) *Attorney, Agent, or Firm* — Barnes & Thornburg LLP

(57) ABSTRACT

An innovative augmented reality/virtual reality (AR/VR) crossbow system that includes a bow frame assembly, a stock, a sight assembly, a cocking assembly, a resistance assembly and an electronic device assembly with a mobile device. These components are configured to structurally interact to provide the user with an experience of loading, aiming and firing a virtual crossbow arrow that closely simulates real-life archery and crossbow scenarios without firing an actual crossbow arrow. Due to its unique components and their layout, the AR/VR crossbow system is not configured to fire real arrows. An interactive crossbow application is loaded on the mobile device and simulate real life archery scenarios such as hunting scenarios or target competition scenarios. The mobile device also includes a gyroscope to analyze the orientation of the crossbow frame assembly and a microphone to determine when a simulated arrow is fired within the crossbow application.

24 Claims, 18 Drawing Sheets

Related U.S. Application Data

(60) Provisional application No. 63/337,071, filed on Apr. 30, 2022.

(58) Field of Classification Search
USPC .............................. 124/25, 86, 87; 463/5, 52
See application file for complete search history.

(56) References Cited

U.S. PATENT DOCUMENTS

| | | |
|---|---|---|
| 2,996,059 A | 8/1961 | Vance |
| 3,004,532 A | 10/1961 | Vance |
| 3,072,115 A | 1/1963 | Johnson |
| 3,747,593 A | 7/1973 | Taylor |
| 3,762,222 A | 10/1973 | Garot et al. |
| 3,800,774 A | 4/1974 | Troncoso |
| 3,853,111 A | 12/1974 | Stanislawski et al. |
| 4,041,926 A | 8/1977 | Troncoso et al. |
| 4,066,051 A | 1/1978 | Alban |
| 4,090,706 A | 5/1978 | Reda |
| 4,156,417 A | 5/1979 | Fletcher |
| 4,160,437 A | 7/1979 | Fletcher |
| 4,279,601 A | 7/1981 | Cobelli |
| 4,326,708 A | 4/1982 | Hinds |
| 4,328,965 A | 5/1982 | Hatfield |
| 4,334,678 A | 6/1982 | Doyel |
| 4,403,594 A | 9/1983 | Todd |
| 4,426,989 A | 1/1984 | Sutton |
| 4,458,657 A | 7/1984 | Stockmar |
| 4,591,150 A | 5/1986 | Mosher |
| 4,593,674 A | 6/1986 | Kudlacek |
| 4,605,223 A | 8/1986 | Rainville |
| 4,609,191 A | 9/1986 | Remme |
| 4,612,907 A | 9/1986 | Gantt |
| 4,623,145 A * | 11/1986 | Paraskevakos ........... F41B 5/14 124/55 |
| 4,683,865 A | 8/1987 | Troncoso |
| 4,708,341 A * | 11/1987 | Paraskevakos ........... F41B 5/14 124/55 |
| 4,739,744 A | 4/1988 | Nurney |
| 4,741,320 A * | 5/1988 | Wiard ................... F41B 5/1476 124/88 |
| 4,741,528 A | 5/1988 | Church |
| 4,757,799 A | 7/1988 | Bozek |
| 4,848,306 A | 7/1989 | Treaster |
| 4,854,293 A | 8/1989 | Roberts |
| 4,909,232 A | 3/1990 | Carella |
| 4,930,485 A | 6/1990 | Kopper |
| 4,986,250 A | 1/1991 | Darlington |
| 5,052,365 A | 10/1991 | Carella |
| 5,054,463 A | 10/1991 | Colley et al. |
| RE34,126 E | 11/1992 | Todd |
| 5,163,413 A | 11/1992 | Carella |
| 5,277,170 A | 1/1994 | Carella |
| 5,328,190 A * | 7/1994 | Dart ..................... A63F 13/213 273/358 |
| 5,353,780 A | 10/1994 | Carella |
| 5,411,460 A | 5/1995 | Karlson et al. |
| 5,484,368 A | 1/1996 | Chang |
| 5,503,135 A | 4/1996 | Bunk |
| 5,592,928 A | 1/1997 | Frasier |
| 5,649,706 A * | 7/1997 | Treat, Jr. .................... F41J 9/14 463/52 |
| 5,653,213 A | 8/1997 | Linsmeyer |
| 5,741,207 A | 4/1998 | Buoni et al. |
| 5,746,687 A | 5/1998 | Vial et al. |
| 5,885,196 A | 3/1999 | Gvoich |
| 6,032,661 A | 3/2000 | Goff et al. |
| 6,425,765 B1 | 7/2002 | Irwin |
| 6,499,478 B1 | 12/2002 | Perez |
| 7,047,958 B1 | 5/2006 | Colley |
| 7,087,001 B1 | 8/2006 | Ihli |
| 7,216,643 B2 * | 5/2007 | Pellerite ................ F41B 5/1469 124/87 |
| 7,506,643 B2 * | 3/2009 | Holmberg ................. F41B 5/12 124/87 |
| 7,618,356 B1 | 11/2009 | Johnson et al. |
| D617,856 S | 6/2010 | Brinser |
| 7,854,694 B1 | 12/2010 | Frunzi |
| 7,926,476 B1 | 4/2011 | Tentler et al. |
| 8,104,461 B2 * | 1/2012 | Kempf ..................... F41B 5/12 124/25 |
| 8,403,818 B1 | 3/2013 | Wilkinson et al. |
| 8,771,154 B2 | 7/2014 | Fedriga |
| 8,819,983 B2 * | 9/2014 | Tate ..................... F16M 13/022 124/88 |
| 8,899,220 B2 * | 12/2014 | Morris, II ................ F41B 5/10 124/23.1 |
| 8,971,959 B2 * | 3/2015 | Hunt .................... F16M 13/022 455/90.3 |
| 9,068,795 B2 * | 6/2015 | Roman ..................... F41G 3/06 |
| 9,254,405 B1 | 2/2016 | Marji |
| 9,633,573 B1 * | 4/2017 | Tafoya .................... A63B 69/00 |
| 10,281,229 B2 * | 5/2019 | Haynes .................. G01L 5/047 |
| 10,281,232 B2 * | 5/2019 | Pell ....................... F41B 5/1426 |
| 10,436,545 B2 * | 10/2019 | Pell ..................... A63B 21/4043 |
| 10,946,272 B2 * | 3/2021 | Fuchs .................... A63F 13/21 |
| 11,131,524 B1 * | 9/2021 | Kempf .................... F41B 5/123 |
| 2002/0086779 A1 | 7/2002 | Wilkinson |
| 2002/0160891 A1 | 10/2002 | Gallagher |
| 2003/0096679 A1 | 5/2003 | Schlueter |
| 2003/0131837 A1 | 7/2003 | Bruman |
| 2004/0014010 A1 * | 1/2004 | Swensen ................ F41G 3/2666 434/21 |
| 2005/0123883 A1 * | 6/2005 | Kennen ................. F41G 3/2611 434/11 |
| 2005/0239617 A1 | 10/2005 | Tenaglia |
| 2007/0193568 A1 | 8/2007 | Lee |
| 2010/0152002 A1 | 6/2010 | Knight |
| 2010/0204024 A1 | 8/2010 | Mills et al. |
| 2010/0263650 A1 | 10/2010 | Dahl, II et al. |
| 2011/0186024 A1 * | 8/2011 | Wang ........................ F41B 5/14 124/24.1 |
| 2011/0207512 A1 * | 8/2011 | Wang ..................... A63F 13/837 463/5 |
| 2014/0038793 A1 | 2/2014 | Hetzel |
| 2014/0113779 A1 | 4/2014 | Loach |
| 2014/0261355 A1 * | 9/2014 | Peacemaker .......... F41B 5/1403 124/23.1 |
| 2015/0300769 A1 | 10/2015 | Heisser |
| 2017/0167823 A1 * | 6/2017 | Kirilov ................... F41G 1/467 |
| 2018/0058961 A1 * | 3/2018 | Dunham ................. G01L 19/08 |
| 2019/0381399 A1 * | 12/2019 | Arbouzov ............... A63F 13/26 |
| 2020/0116453 A1 | 4/2020 | Pell |
| 2021/0023442 A1 | 1/2021 | Fuchs et al. |
| 2022/0113106 A1 * | 4/2022 | Blackstock ............... F41B 5/12 |
| 2023/0408219 A1 * | 12/2023 | Obteshka ............... F41B 5/1469 |

FOREIGN PATENT DOCUMENTS

| | | |
|---|---|---|
| FR | 728948 A | 7/1932 |
| FR | 2647200 A1 | 11/1990 |
| JP | 53105097 A | 9/1978 |
| JP | 2000219865 A | 8/2000 |
| JP | 3096376 B2 | 10/2000 |
| JP | 2000302926 A | 10/2000 |
| JP | 2002352834 A | 12/2002 |
| JP | 2003034400 A | 2/2003 |
| JP | 2007215996 A | 8/2007 |
| JP | 4668895 B2 | 4/2011 |
| KR | 20130022664 A | 3/2013 |
| MX | 2010004591 A | 10/2011 |
| WO | 03000349 | 1/2003 |

OTHER PUBLICATIONS

Miller Archery Training Device, https://web.archive.org/web/20120222034909/http://bowhunting.net:80/2012/02/releasing-for-increased-accuracy-with-back-tension, Feb. 22, 2012.
Firing-Line, https://web.archive.org/web/20111210172701/http://www.sausa.com:80/category.php?category=41, Dec. 10, 2011.

(56) References Cited

OTHER PUBLICATIONS

Win & Win Stretching Band, https://web.archive.org/web/20110311220808/https://www.abbeyarchery.com.au/p/WWWSB/Win+%26amp%3B+Win+Scapower+Stretching+Band.html, Apr. 14, 2013.
Bow Fit, https://web.archive.org/web/20120328070500/http://www.bowfit.com:80/products.html#bowfit, Mar. 28, 2012.
Morin Archery Trainer, Sep. 21, 2012.
Kyudo Trainer, https://zensekai.wordpress.com/category/international-marriage/page/2/, May 27, 2011.
Kyudo Trainer, http://www.dannychoo.com/en/post/25877/Kyudo.html, Oct. 21, 2012.
Toxoshot Archery Training Bow, Mar. 9, 2011.
Bow Trainer, https://web.archive.org/web/20121114065101/http://www.lancasterarchery.com/prairie-innovators-bow-trainertm-training-device.html, Nov. 14, 2012.
Archery Practice Loop, https://web.archive.org/web/20110306044903/http://archeryreport.com:80/2010/05/archery-practice-loop-tool-thousand/, Mar. 6, 2011.
YouTube D-Loop Video, https://www.youtube.com/watch?v=50Tu5cQOcX8, Apr. 28, 2014.
D-Loop Article, https://web.archive.org/web/20120110005345/http://archeryreport.com/2012/01/bowstring-dloops-torqueless-loops-variations-advantages-disadvantages/, Jan. 10, 2012.
YouTube D-Loop Video, https://www.youtube.com/watch?v=_6AojeoAQpw, Dec. 22, 2010.
YouTube D-Loop Video, https://www.youtube.com/watch?v=Yz88pX-Eoll, Feb. 20, 2014.
D-Loop Article, https://web.archive.org/web/20140204042515/http://www.archery.org.au/FAQs/Equipment/How-to-attach-D-Loops, Feb. 4, 2014.
YouTube D-Loop Video, https://www.youtube.com/watch?v=4qytQDzWj_A, Nov. 12, 2009.
ArcheryHistory.com, https://web.archive.org/web/20081208234308/http://www.archeryhistory.com:80/releases/releases.htm, Dec. 8, 2008.
Bow Release Aids Article, https://1source.basspro.com/index.php/component/k2/85-archery/851-breaking-down-the-different-bow-release-aids, May 8, 2013.
Release Aids Article, http://www.bow-international.com/features/mastering-the-release-aid/, Apr. 11, 2013.
International Search Report and Written Opinion for PCT/US2023/020538 dated Sep. 1, 2023 (36 pages).

* cited by examiner

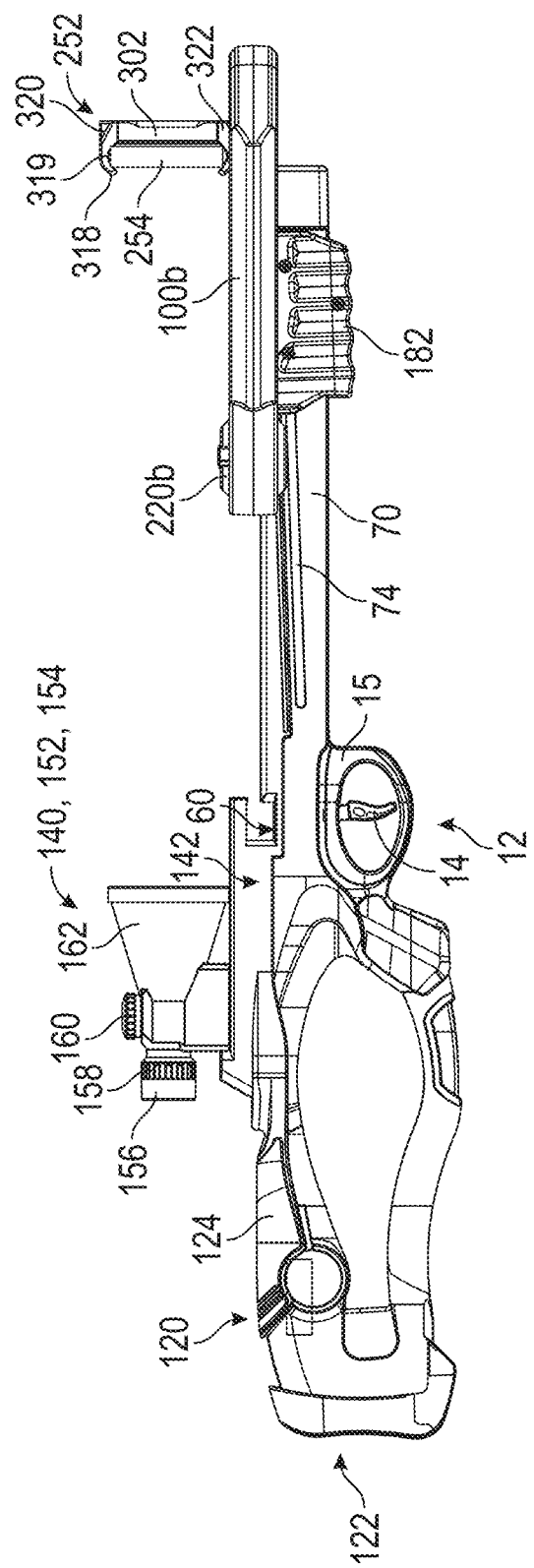
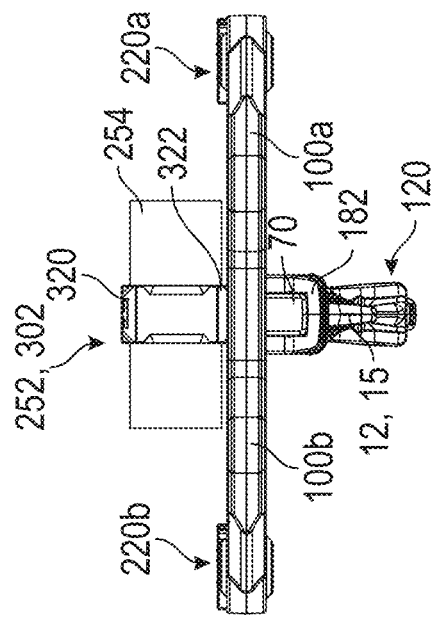
FIG. 4
FIG. 6
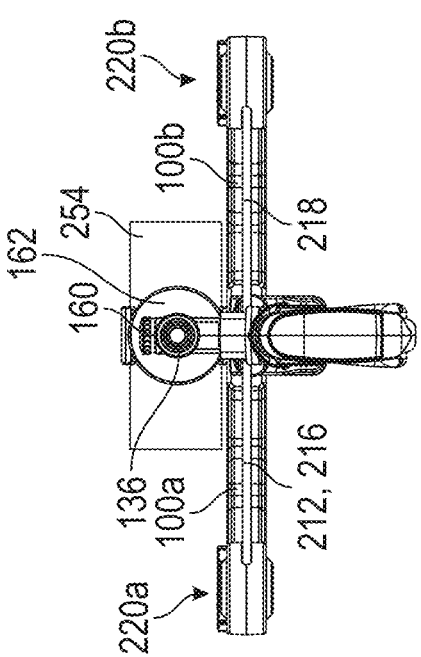
FIG. 5

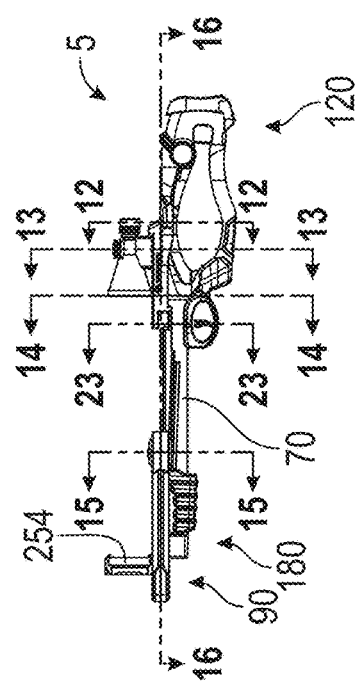
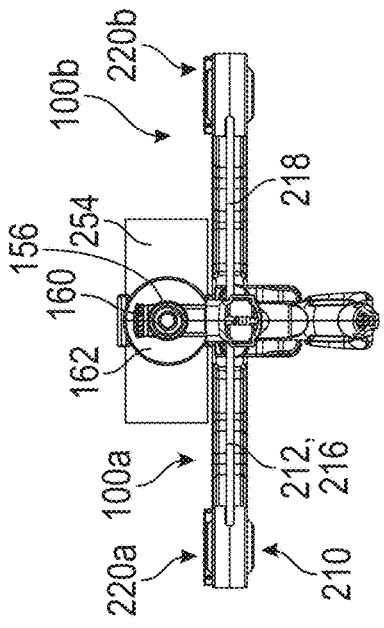
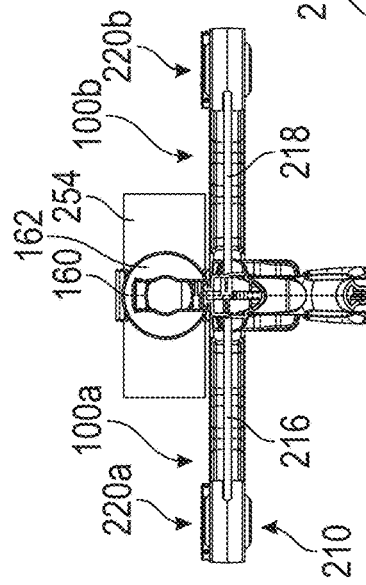
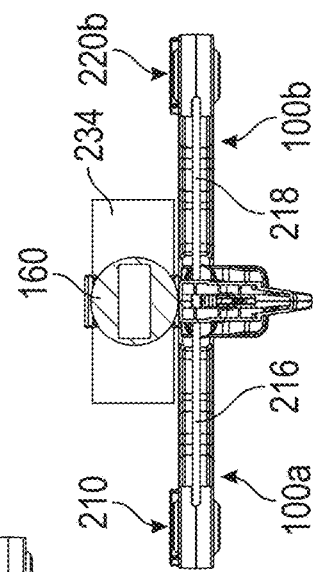
FIG. 11
FIG. 12
FIG. 13
FIG. 14

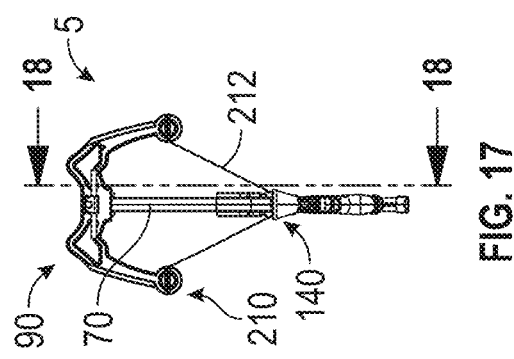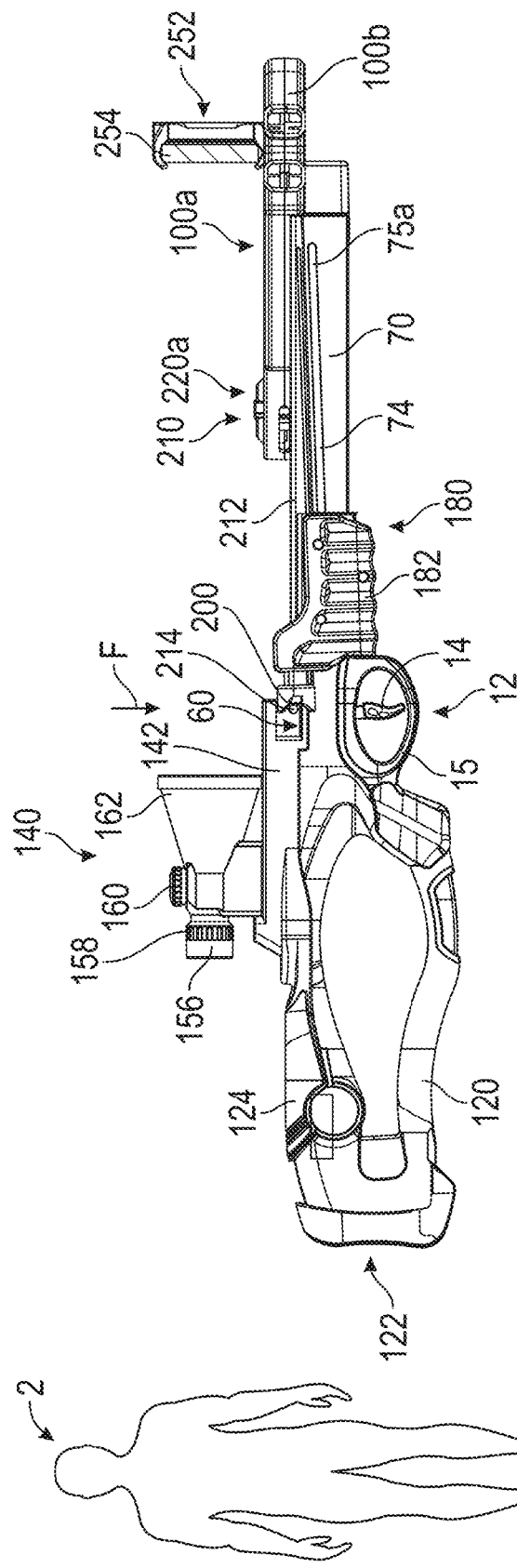

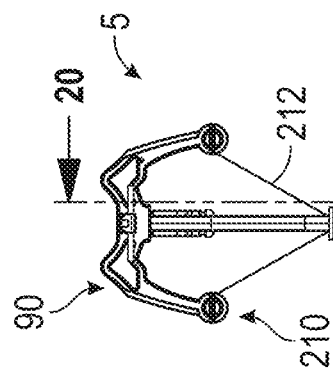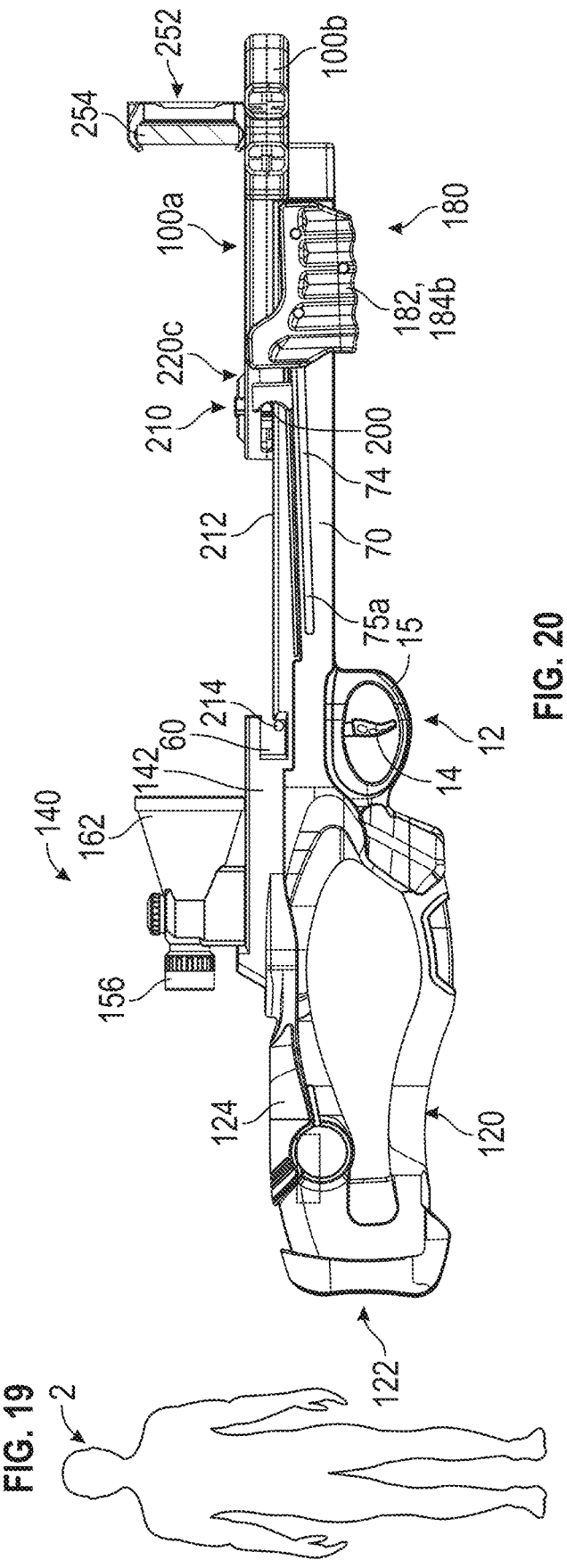

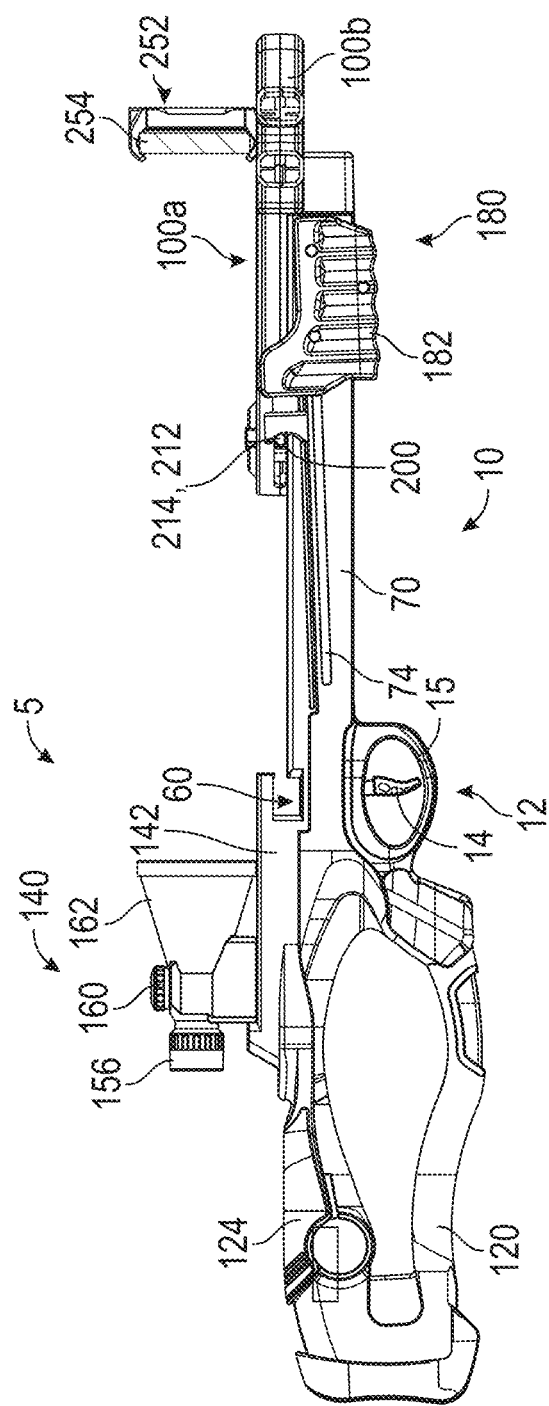
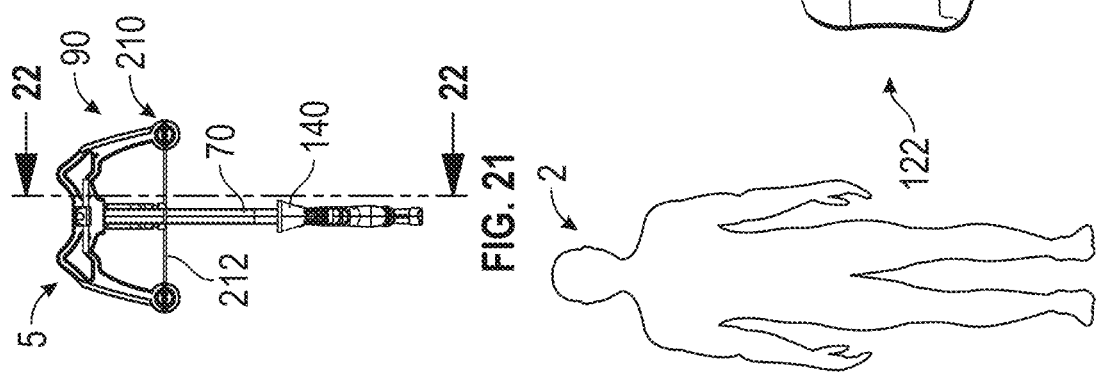

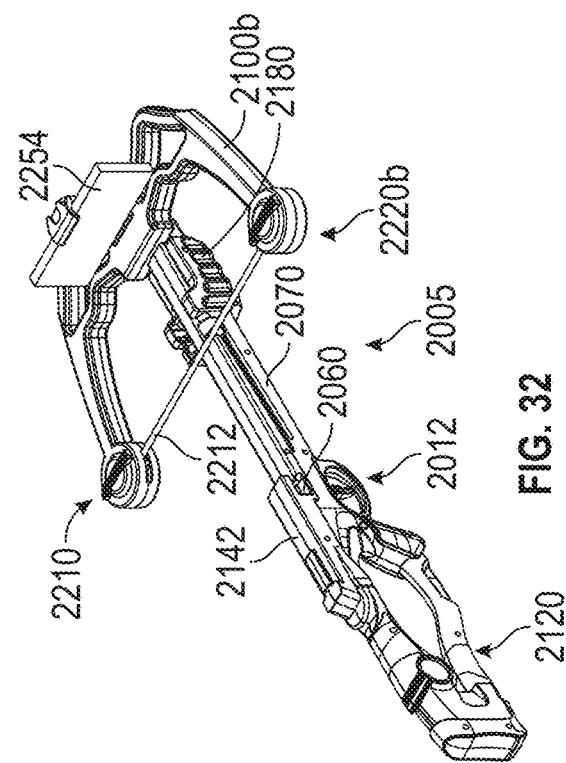
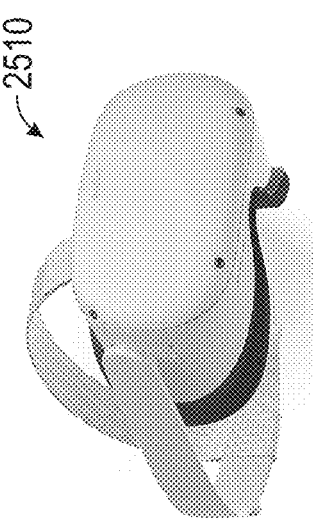
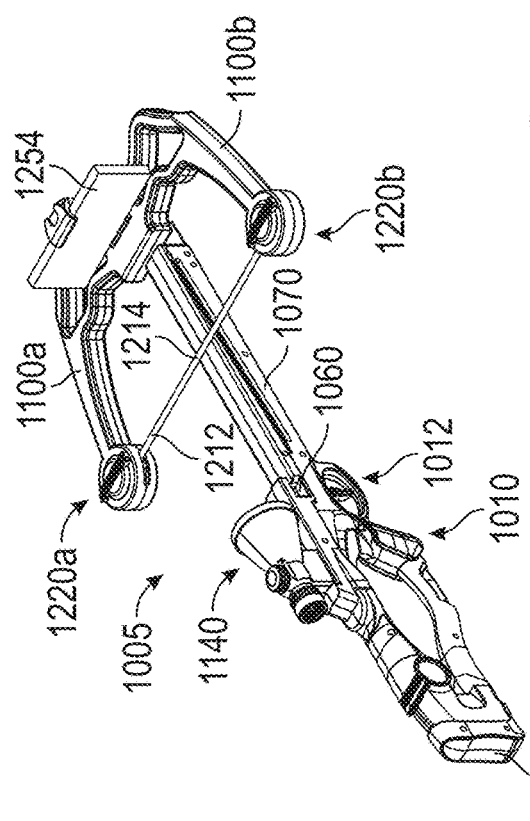
FIG. 31
FIG. 32

AR/VR CROSSBOW SYSTEM

CROSS-REFERENCE TO RELATED APPLICATIONS

This application is a continuation of PCT Application No. US2023/020538, filed on May 1, 2023, which claims priority from U.S. Provisional Patent Application No. 63/337,071, filed on Apr. 30, 2022, which is incorporated herein by reference and made a part hereof. Also, U.S. patent application Ser. Nos. 16/403,972 and 15/215,289, and U.S. Provisional Patent Application Nos. 62/556,650 and 62/231,889 are incorporated herein by reference and made a part hereof.

TECHNICAL FIELD

This disclosure relates to an augmented reality/virtual reality (AR/VR) crossbow system that includes a bow frame assembly, a stock, a sight assembly, a cocking assembly, a resistance assembly and an electronic device assembly, which are configured to function together to provide for the loading, aiming and firing of a virtual crossbow arrow or "bolt" that simulates real-life archery and crossbow scenarios without firing an actual crossbow arrow.

BACKGROUND

Archery is a sport that dates back centuries. Archery practice, hunting and competitions can be found world-wide. An archer's technique, in terms of the archer-'s balance, stability, composure and strength, is critical for ensuring accuracy, range and consistency in delivering an arrow to the target. These skills can be acquired or improved through continual practice. However, such practice may be difficult considering time, financial and/or equipment constraints. For example, practicing the release of an arrow using a crossbow is a crucial aspect of ensuring accuracy, range and consistency in delivering an arrow to the target. However, practicing the release of an arrow on a conventional crossbow can only be achieved by releasing actual arrows, which requires an adequate facility or environment that includes a target positioned a considerable distance from the operator using the conventional crossbow. Dry-firing a conventional crossbow, or firing the conventional crossbow without an arrow, may damage a conventional crossbow and present safety risks to the user.

Several virtual reality systems have recently developed archery-like games. However, these games fail to simulate real-life archery scenarios for several reasons, including the fact that these systems have wires that restrict a user's movement. In addition, these systems fail to simulate attributes of a user's crossbow, which include the weight of the crossbow, draw weight, or draw length. Further, these systems fail to allow the user to modify the virtual crossbow to mimic the user's traditional crossbow that is capable of firing an arrow.

Accordingly, there is an unmet need for a crossbow system that can simulate real-life archery scenarios to allow the archer to practice in order to improve his/her accuracy while also managing psychological conditions, such as target panic.

SUMMARY OF THE INVENTION

The present disclosure provides an AR/VR crossbow system that includes a bow frame, cocking assembly, an electronic device, and a resistance assembly, which structurally and functionally interact to allow the user to load, aim and fire a virtual crossbow arrow that simulates real-life archery and crossbow scenarios without firing an actual crossbow arrow.

The mobile device in the AR/VR crossbow system has at least an integrated magnetometer, MEMS gyroscope, and a display. The magnetometer is configured to provide an initial reference point for the crossbow application, while the MEMS gyroscope is configured to inform the crossbow application how far the mobile device has moved from the initial reference point. Both the magnetometer and the MEMS gyroscope are utilized by the crossbow application to render and alter the graphics on the integrated display according to the movement of the mobile device.

The AR/VR crossbow system includes a means for determining trigger pull, which is configured to determine when the user pulls the trigger. In one embodiment, said means for determining trigger pull is a microphone built into the mobile device. In one embodiment, the microphone records the sound produced from the contact of the resistance member and the end of the vibration damper upon the draw and release of the resistance member. If the sound produced is more significant than a predetermined level, then the crossbow application will fire a simulated arrow at the simulated target within the crossbow application. In other embodiments, said means for determining trigger pull is a sensor that may be embedded in an extent of the crossbow, mobile device, or another device.

The AR/VR crossbow system provides simulated real-life archery scenarios, such as Olympic target shooting, hunting, strength building, augmented reality archery training scenario, virtual reality archery challenge, and augmented reality archery challenge. The flight path of the simulated arrow may be displayed on the mobile device's screen. A gravitational force or wind may alter this flight path. After the flight path has been displayed, the impact location of the simulated arrow may be displayed on the mobile device, and points may be awarded to the user based on how close to the simulated target the simulated arrow landed. Other features and advantages of the disclosure will be apparent from the following specification taken in conjunction with the following drawings.

BRIEF DESCRIPTION OF THE DRAWINGS

The accompanying drawings or figures, which are included to provide further understanding and are incorporated in and constitute a part of this specification, illustrate disclosed embodiments and together with the description serve to explain the principles of the disclosed embodiments. In the Figures, like reference numerals refer to the same or similar elements throughout the Figures. In the drawings:

FIG. 4 is a right side view of the AR/VR crossbow system of FIG. 1, where the left side view is the same image because the AR/VR crossbow system is symmetric along its longitudinal axis;

FIG. 5 is a rear view of the AR/VR crossbow system of FIG. 1;

FIG. 6 is a front view of the AR/VR crossbow system of FIG. 1;

FIG. 11 is a left side view of the AR/VR crossbow system of FIG. 1;

FIG. 12 is a cross-sectional view of the AR/VR crossbow system taken along line 12-12 of FIG. 11, showing a first view through an extent of the sight assembly;

FIG. 13 is a cross-sectional view of the AR/VR crossbow system taken along line 13-13 of FIG. 11, showing a second view through an extent of the sight assembly;

FIG. 14 is a cross-sectional view of the AR/VR crossbow system taken along line 14-14 of FIG. 11, showing a third view through an extent of the sight assembly;

FIG. 17 is a top view of the AR/VR crossbow system in a cocked state that occurs after the ready to use state;

FIG. 18 is a cross-sectional view of the AR/VR crossbow system taken along line 18-18 of FIG. 17, showing the AR/VR crossbow system in the cocked state;

FIG. 19 is a top view of the AR/VR crossbow system in the ready to fire state;

FIG. 20 is a cross-sectional view of the AR/VR crossbow system taken along line 20-20 of FIG. 19, showing the AR/VR crossbow system in the ready to fire state;

FIG. 21 is a top view of the AR/VR crossbow system in a fired state;

FIG. 22 is a cross-sectional view of the AR/VR crossbow system taken along line 22-22 of FIG. 21, showing the AR/VR crossbow system in the fired state;

FIG. 31 is a second embodiment of the AR/VR crossbow system, where the cocking assembly has been omitted and the cocked state is manually achieved;

FIG. 32 is a second embodiment of the AR/VR crossbow system, which utilizes a headset;

DETAILED DESCRIPTION

Figure 1:
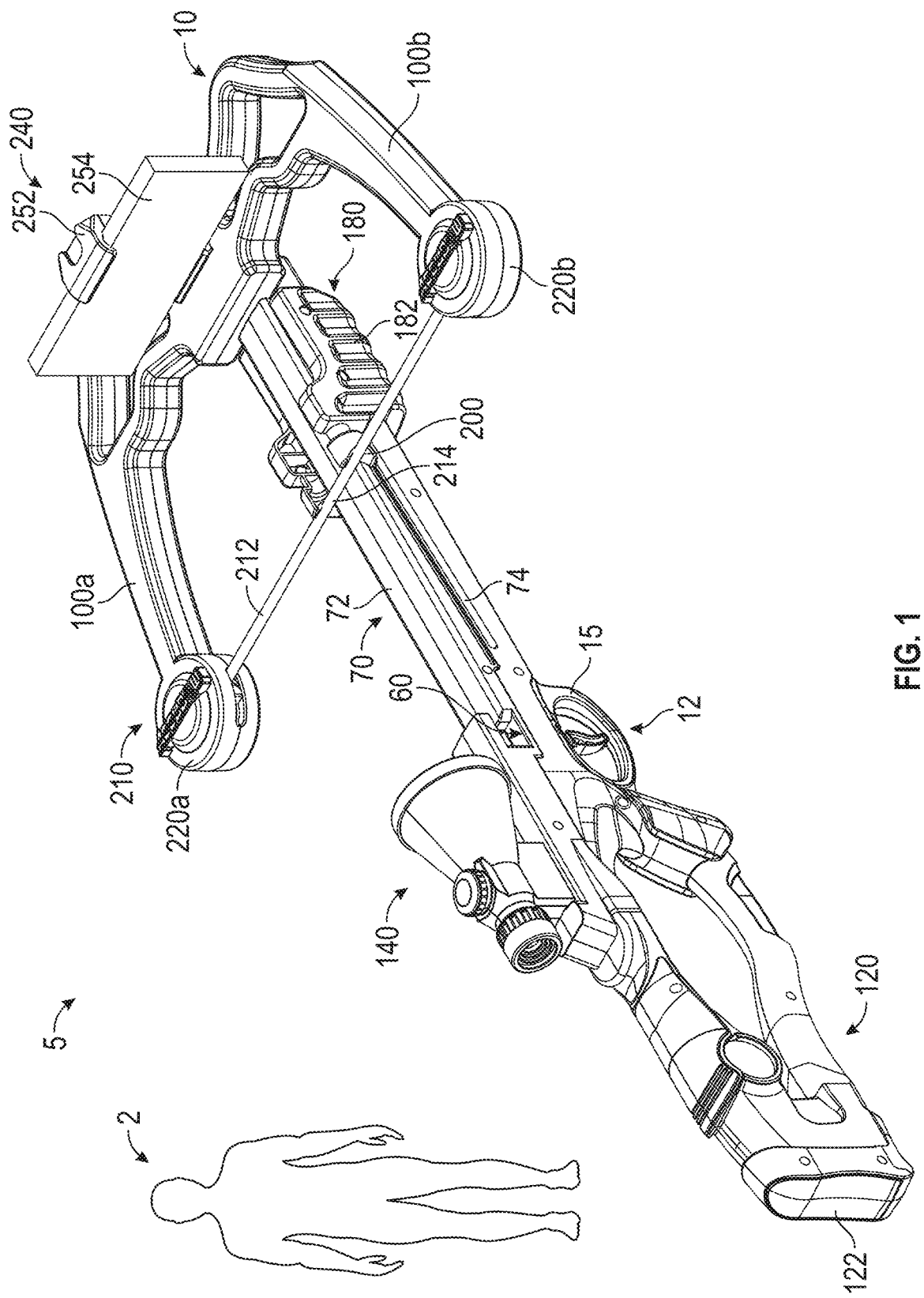
FIG. 1 is a perspective view of an AR/VR crossbow system in a ready to use state and having a bow frame assembly, a stock, a sight assembly, a cocking assembly, a resistance assembly and an electronic device assembly.
Figure 3:
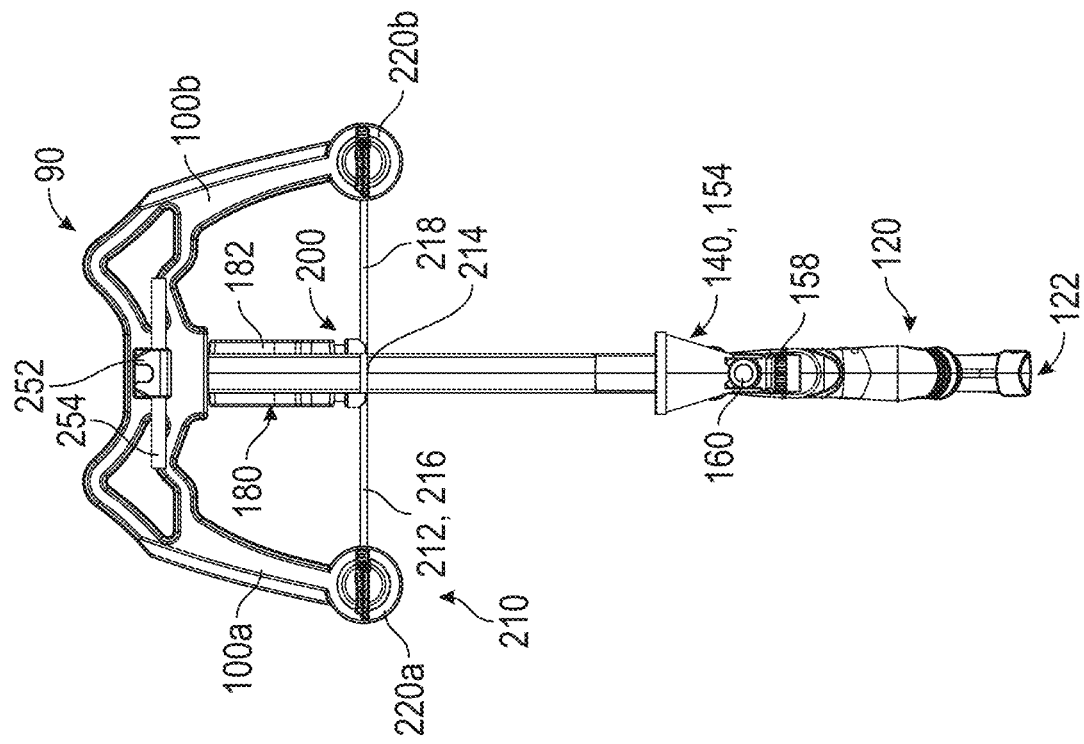
FIG. 3 is a top view of the AR/VR crossbow system of FIG. 1.
Figure 2:
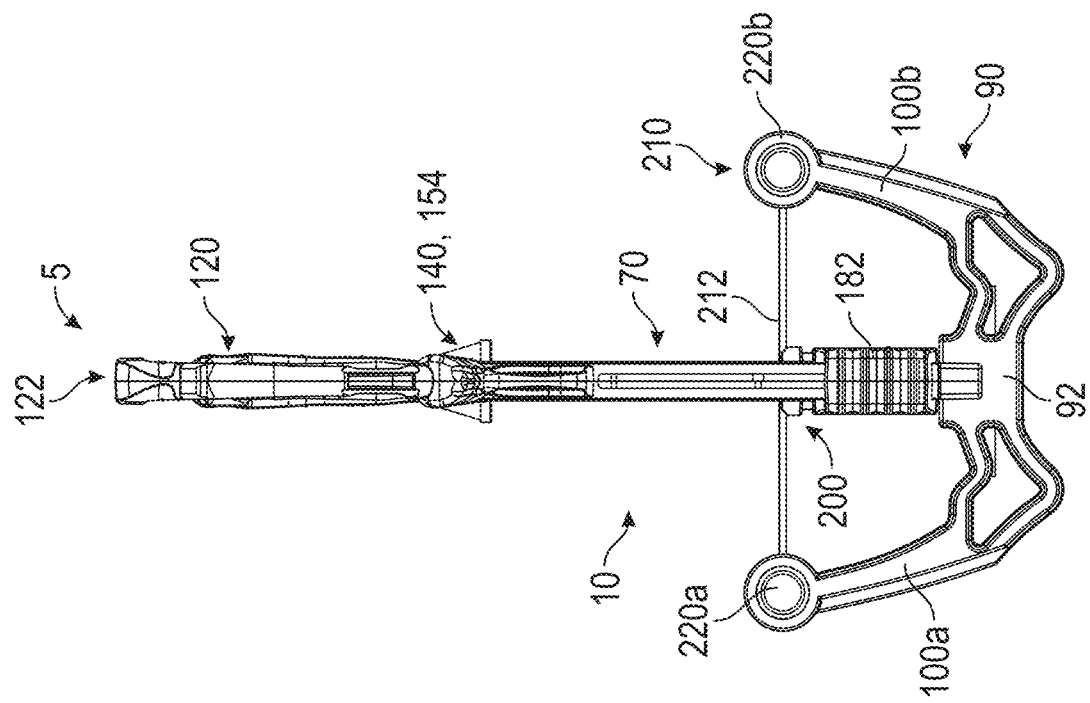
FIG. 2 is a bottom view of the AR/VR crossbow system of FIG. 1.
Figure 7:
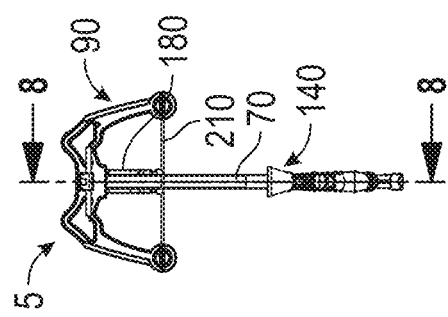
FIG. 7 is a top view of the AR/VR crossbow system in the ready to use state.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings. While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. Accordingly, the drawings and detailed descriptions are to be regarded as illustrative in nature, not restrictive or limiting.

This disclosure relates to an AR/VR crossbow system 5, which is not configured to fire real arrows, bolts or projectiles. Because the disclosed AR/VR crossbow system 5 is not capable of firing real arrows, bolts or projectile, the system 5 is designed for training, practice and entertainment. As such, the AR/VR crossbow system 5 is comprised of a bow frame assembly 10, a stock 120, a sight assembly 140, a cocking assembly 180, a resistance assembly 210 and an electronic device assembly 240. The AR/VR crossbow system 5 is used to enhance the user's skills, such as his/her strength, stability and accuracy in delivering an arrow fired from a real, non-training bow to the target. In addition, the AR/VR crossbow system 5 simulates real-life scenarios that an archer may face during an archery competition or a hunt. Practicing in these scenarios allows the user to reduce target panic and improves performance.

1) Bow Frame Assembly

FIGS. 1-23 focus on the bow frame assembly 10, which includes: (i) a trigger assembly 12, (ii) a serving receiver 60, (iii) a central member 70 with a rail 72, and (iv) a frontal frame assembly 90. The trigger assembly 12 is coupled to both the central member 70 and the stock 120 and is designed to allow the user or archer 2 to: (i) release the resistance assembly 210 from the drawn position (see e.g. FIGS. 17-20), (ii) move the crossbow 5 from a ready to fire state (see e.g. FIG. 19-20) to a fired state (see e.g. FIGS. 21-22), and (iii) fire a simulated arrow on the mobile device 254. In this application and in the Figures, the term "state" is used in connection with the crossbow system 5, while the term "position" is used in connection with components of the crossbow system 5, including the resistance assembly 210 and the trigger assembly 12.

Figure 8:
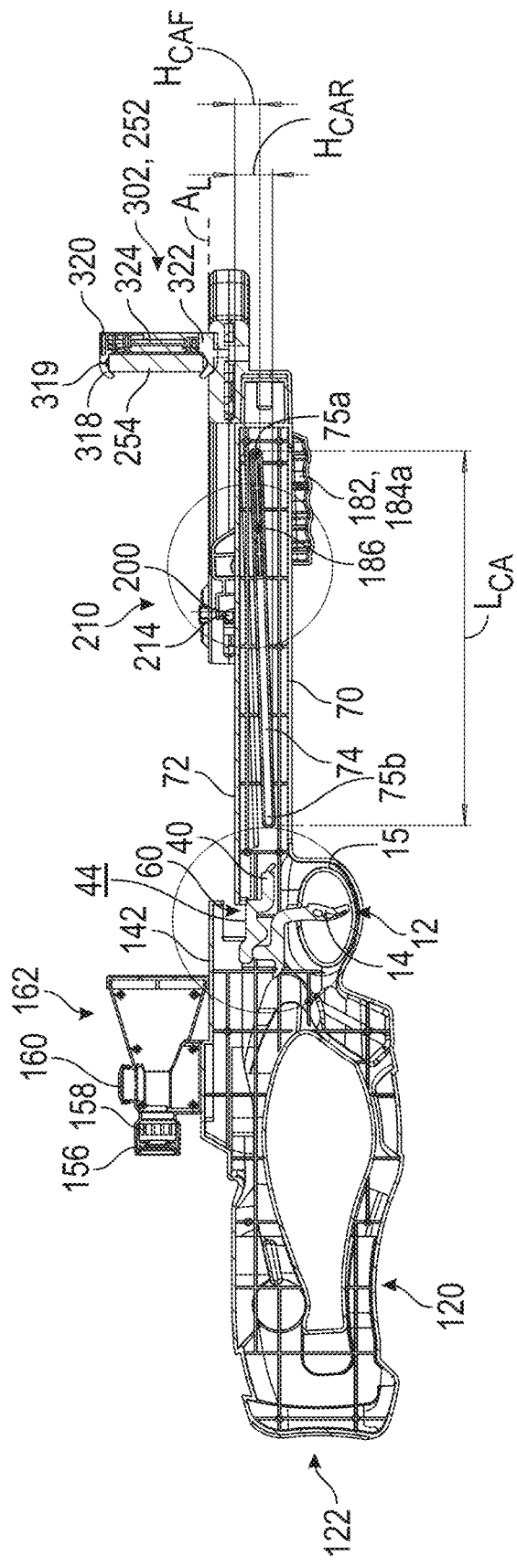
FIG. 8 is a cross-sectional view of the AR/VR crossbow system taken along line 8-8 of FIG. 7.
Figure 10:
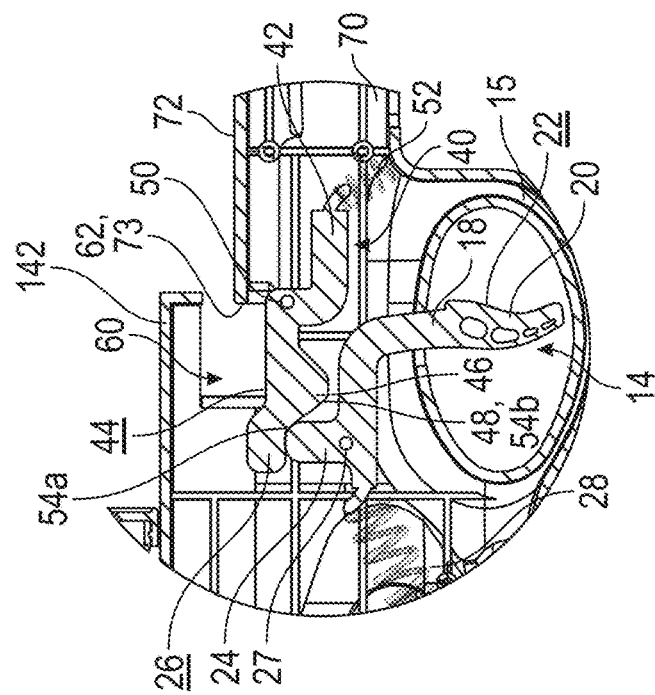
FIG. 10 is a zoomed in view of a second extent of the AR/VR crossbow system in FIG. 9.
Figure 9:
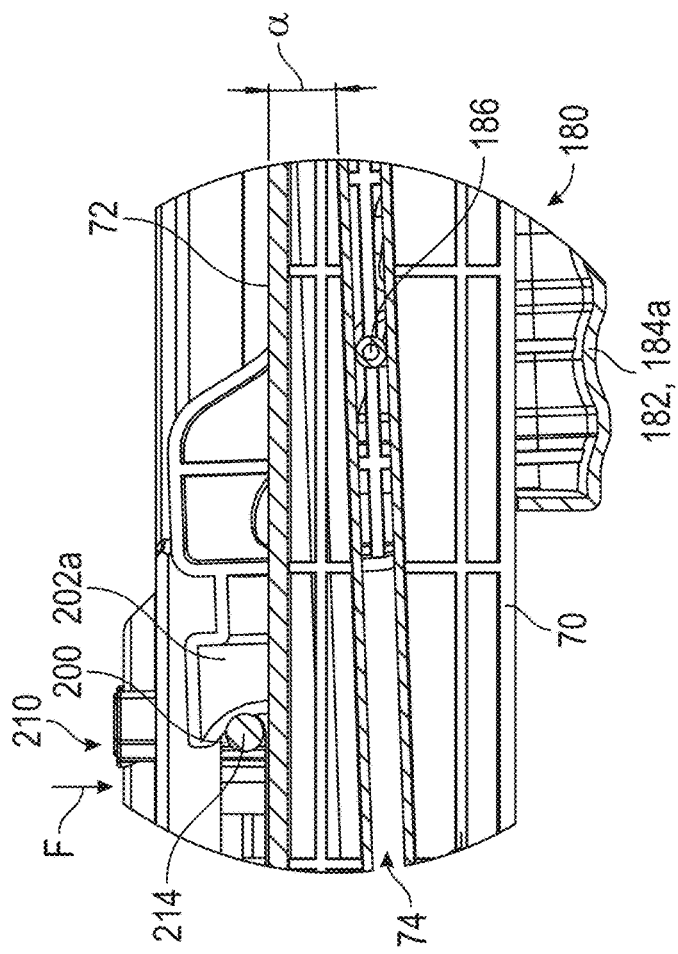
FIG. 9 is a zoomed in view of a first extent of the AR/VR crossbow system in FIG. 8.
Figure 15:
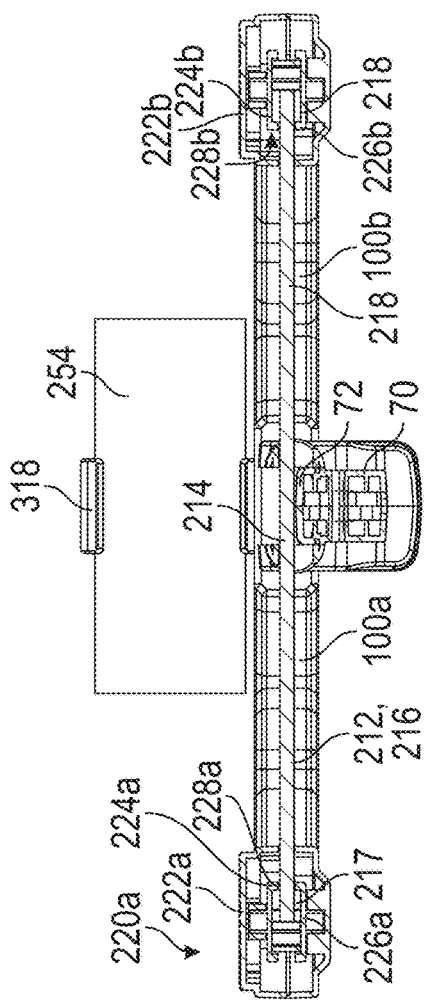
FIG. 15 is a cross-sectional view of the AR/VR crossbow system taken along line 15-15 of FIG. 11, showing an extent of the resistance assembly.
Figure 16:
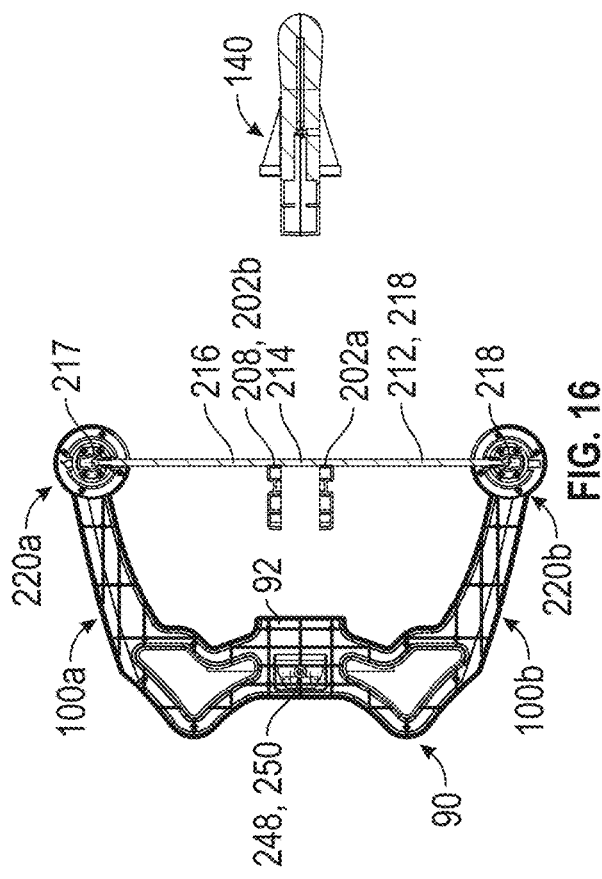
FIG. 16 is a cross-sectional view of the AR/VR crossbow system taken along line 16-16 of FIG. 11, showing an extent of the resistance assembly and cocking assembly.
Figure 23:
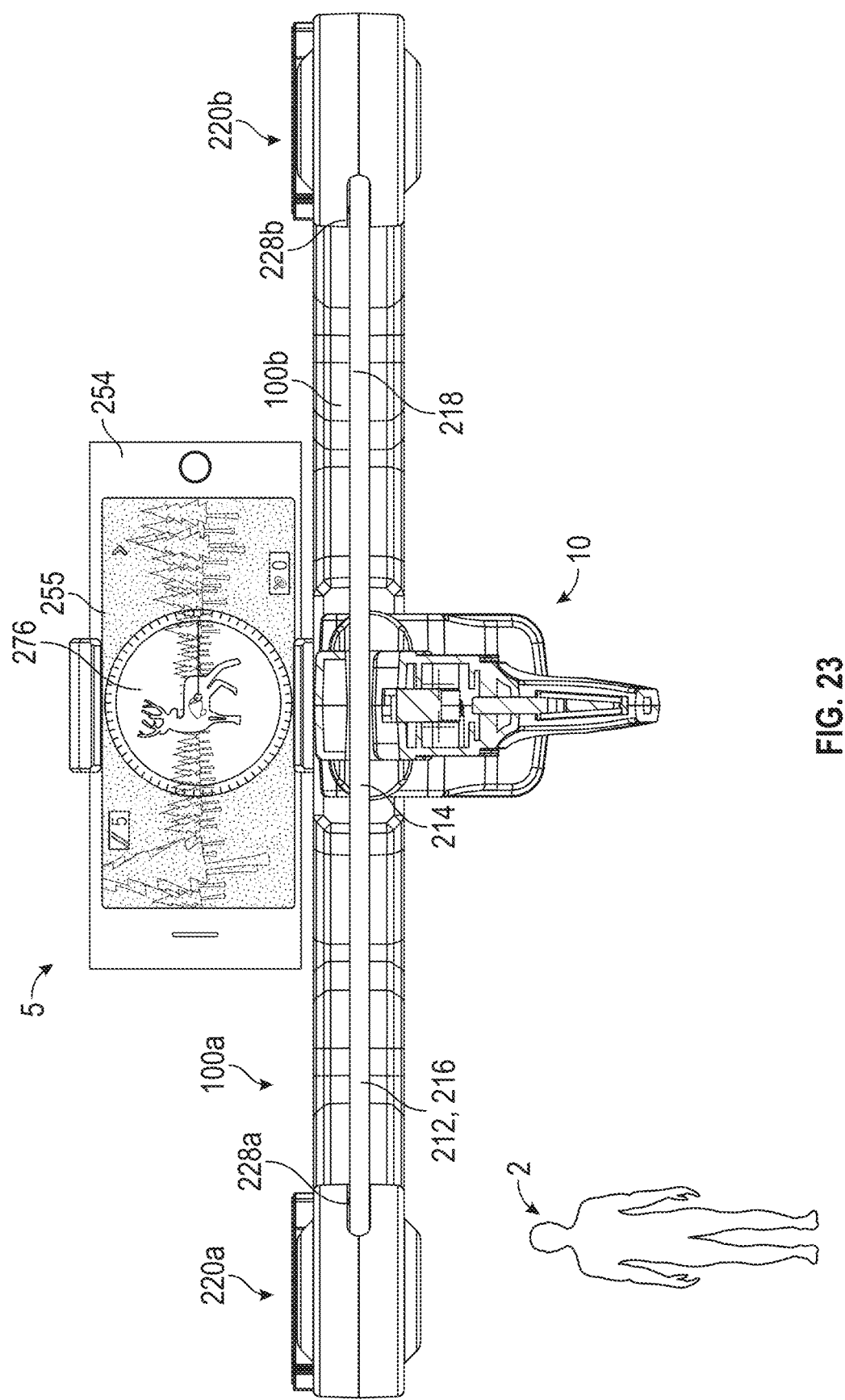
FIG. 23 is a cross-sectional view of the AR/VR crossbow system taken along line 23-23 of FIG. 11 showing an electronic device assembly with a crossbow application installed thereon.

The trigger assembly 12 is best shown in FIGS. 8 and 10 and includes: (i) a trigger 14, (ii) a trigger guard 15, and (ii) an actuator 40. The trigger 14 is configured to interact with the user and includes: (i) a main body 18, (ii) a downwardly extending projection 20 with a contact surface 22, and (iii) an upwardly extending projection 24 with an interactive surface 26. The trigger 14 is designed to pivot about a trigger pivot pin 27 received in an extent of the main body 18, while being biased by a trigger spring 28. The actuator 40 is positioned above the trigger 14 and is configured to interact with the trigger 14 and a serving segment 214 of the resistance element 212. Specifically, the actuator 40 includes: (i) a main body 42 having a serving engagement surface 44, (ii) an actuator projection 46 having a trigger engagement surface 48. When a sufficient amount of force is applied by the trigger 14 via a trigger pull by the archer, the actuator 40 is designed to pivot about the actuator pivot pin 50 that is received in an extent of the main body 42, while being biased by an actuator spring 52.

The serving receiver 60 receives an extent of the serving segment 214 when the crossbow 5 is in the cocked state or the ready to fire state. As shown in FIG. 10, the serving receiver 60 is a receptacle formed by: (i) a serving engagement surface 44 of the actuator 40 of the trigger assembly 12, (ii) a serving retention element 62 formed with or in an end wall 73 of the central member 70, and (iii) a frontal extent 142 of the sight assembly 140. As shown in FIG. 10, the frontal extent 142 of the sight assembly 140 overhangs the serving engagement surface 44 and defines an upper boundary of the receiver 60. It should be understood that in other embodiments, the frontal extent 142 of the sight assembly 140 may be omitted or a vertical wall may extend downward from the central member 70 and be positioned between a lower extent of the end wall 73 and an extent of the actuator 40.

As shown in numerous Figures, the central member 70 extends between: (i) the stock 120 and the sight assembly 140 and (ii) the frontal frame assembly 90. The central member 70 has: (i) an upper surface that includes the rail 72, and (ii) a cocking assembly channel 74. In the embodiment shown in the Figures, the cocking assembly channel 74 is an opening formed entirely through the central member 70. Alternatively, the cocking assembly channel 74 is a recess formed in both side walls of the central member 70 without extending entirely through it. As explained below, the cocking assembly channel 74 is designed to receive an extent of the cocking assembly 180. The received extent of the cocking assembly 180 is positioned within the cocking assembly channel 74 and can be slidingly displaced along an extent of the channel 74 to allow the crossbow 5 to move between the various states of operation.

Referring to FIG. 8, the cocking assembly channel 74 has a length $L_{CA}$ that is between 200 and 300 mm and is disposed at an angle in relation to the rail 72. Specifically, a first or frontal portion 75a of the center of the cocking assembly channel 74 is positioned a frontal height $H_{CAF}$ from the rail 72, while a second or rear portion 75b of the center of the cocking assembly channel 74 is positioned a rear height $H_{CAR}$ from the rail 72, wherein the rear height $H_{CAR}$ is greater than the frontal height $H_{CAF}$. In the disclosed embodiment, the frontal height $H_{CAF}$ is between 10 mm and 22 mm and the rear height $H_{CAR}$ is between 19 mm and 32 mm. As such, an angle alpha $\alpha$ is formed between the cocking assembly channel 74 and the rail 72, wherein alpha may be between 0.1° and 5°, preferably 2°. This angular relationship between the cocking assembly channel 74 and the rail 72 allows the cocking assembly 180 to apply a downwardly directed force F (see FIGS. 9 and 18) on the serving segment 214 of the resistance element 212 to force the serving segment 214 into the serving receiver 60 when the crossbow 5 moves from the ready to use state to the cocked state. Without this angular relationship between the cocking assembly channel 74 and the rail 72, the configuration of the disclosed trigger assembly 12 would not optimally function because the serving 214 would not be forced by the cocking assembly 180 behind or rearward of the end wall 73 of the central member 70. Instead, the serving 214 would remain in contact with a cradle 200 of the cocking assembly 180 (which is detailed below). It should be understood that in other embodiments, the rail 72 may be angularly oriented with respect to a longitudinal axis $A_L$ (FIG. 8) of the bow 5 that extends through an upper surface of the riser 92 and the cocking assembly channel 74 may be substantially parallel with that longitudinal axis. In a further embodiment, both the rail 72 and the cocking assembly channel 74 may be angled in relationship to an to a longitudinal axis of the bow 5 that extends through an upper surface of the riser 92.

In another embodiment of the bow 5 that is not shown in the Figures, the angular relationship between the cocking assembly channel 74 and the rail 72 is not present. If the angular relationship is omitted, the lack of downwardly directed force on the serving 214 may be overcome in a number of different ways. For example, the system 5 may require the user to apply a downwardly directed force on the resistance assembly 212 when cocking the crossbow 5. In another embodiment, the trigger assembly 12 and related structures may be replaced with other known trigger designs (e.g., Chinese vertical trigger lock, European rolling nut lock, or any mechanisms disclosed in U.S. Pat. Nos. 3,490,429, 4,030,473, 4,479,480, 4,877,008, 4,693,228, 5,649,520, 5,596,976, 6,425,386, 6,736,123, 7,174,884, 7,588,022, 9,140,516, 9,404,701, 9,404,705, 8,985,091, 9,004,053, 10,859,341, 9,506,715, 9,523,549, 10,197,354, 10,215,522, all of which are incorporated herein by reference) that do not require the angular relationship between the cocking assembly channel 74 and the rail 72 discussed above.

As shown in FIGS. 1-4, the frontal frame assembly 90 is coupled to a frontal extent of the central member 70 and includes: (i) a riser 92 with a mount port 250, and (ii) left and right limbs 100a, 100b. The riser 92 is directly connected to the central member 70 and is designed to interact with the cocking assembly 180. In particular, when the crossbow 5 is in the ready to fire state or the fired state, a frontal extent of the cocking assembly 180 abuts a rear extent of the riser 92. In addition to the riser's 92 interaction with the cocking assembly 180, the disclosed riser 92 includes the mount port 250 for the electronic device assembly 240. By positioning the mount port 250 in the center of the riser 92, the crossbow 5 aligns a mobile device 254 of the electronic device assembly 240 with the sight assembly 140 such that a user 2 can view said mobile device 254 through the sight assembly 140. As shown in the alternative embodiments in connection with FIGS. 33 and 34, said mount port 250 may be utilized to mount an integrated circuit 3500 or an external controller 4600, such as a controller for the VR system, to a variety of locations on the crossbow 5, including as a replacement to the scope 154.

The disclosed left and right limbs 100a, 100b are coupled to the riser 92 and extend rearwardly and laterally from the riser 92. The left and right limbs 100a, 100b are directly coupled to an extent of the resistance assembly 210 and enable the serving segment 214 of the resistance element 212 to be positioned in a location that allows for its interaction with the cocking assembly 180. In other words, how far the limbs extend rearward and/or laterally from the riser 92 is correlated with the configuration of the cocking assembly 180. As such, the rearward extent of the limbs 100a, 100b may be minimized if the cocking assembly 180 is omitted (as shown in FIG. 31). In contrast, if the length of the cocking assembly 180 is increased, then the rearward extent of the limbs 100a, 100b will likely also need to be increased.

The vertical orientation of the limbs 100a, 100b in relation to the rail 72 allows for an extent of the resistance assembly 210 to be positioned in a location that is slightly above the rail 72, whereby this positional relationship causes the serving segment 214 of the resistance assembly 210 to be retained between the rail 72 and the cradle 200. In other words, moving the vertical orientation of the limbs 100a, 100b upward in relationship to the rail 72 would cause the formation of a gap between the rail 72 and the serving 214 and moving the vertical orientation of the limbs 100a, 100b downward in relationship to the rail 72 would cause undesired tension to be placed on the resistance element 212, both of which negatively impact movement of the resistance element 212. Nevertheless, in an alternative embodiment, the downwardly sloping configuration of the cocking assembly channel 74 may be omitted by moving the vertical orientation of the limbs 100a, 100b downward in relationship to the rail 72 because this orientation can allow for the formation of the desired downwardly directed force on the serving 214 of the resistance element 212.

Finally, the lateral extent of the limbs 100a, 100b positions an extent of the resistance assembly 210 a distance away from the central member 70. This lateral extension: (i) provides the crossbow 5 with a realistic look and feel as compared to conventional crossbows that fire actual arrows, and (ii) helps ensure that the serving segment 214 is unobstructed from its movement along the rail 72. It should be understood that in other embodiments, the lateral extent of the limbs 100a, 100b may be increased, decreased, or may be configured in a manner that allows the limbs 100a, 100b to be laterally folded (e.g., positioned adjacent the central member 70) during non-use of the crossbow 5 to minimize space that is occupied during the shipping and/or transport of said crossbow 5.

2) Stock and Sight Assembly

FIGS. 1-6 and 13-22 show the stock 120 and the sight assembly 140. The stock 120 extends rearward from the central member 70 and includes: (i) a butt stop 122, and (ii) a check rest 124. In particular, the butt stop 122 of the stock 120 is designed to be positioned against the user's shoulder when the crossbow 5 is being aimed and fired. This configuration requires the stock 120 to have a length that allows: (i) the sight assembly 140 to be positioned a proper distance from the user's head, (ii) the user's cheek to be positioned adjacent to the cheek rest 124, and (iii) the user's arms to properly engage with the hand grip 182 and the trigger assembly 12. The stock 120 disclosed within the Figures has a fixed length; however, it should be understood that the disclosed stock 120 may be replaced in other embodiments with a folding stock or an extendable stock, both of which are beneficial because they minimize space that is occupied during the shipping and transport of said crossbow 5).

The sight assembly 140 is configured to allow the user to focus on the display 255 of the mobile device 524 and includes: (i) a sight rail 142, and (ii) a sight 152. The sight 152 disclosed in the figures is a scope 154 having an eyepiece 156, a power ring 158, an adjustment knob 160, and an objective bell 162. The disclosed scope 154 may lack lenses or optics and the functionality associated with a traditional scope used with conventional crossbows (or firearms). Nevertheless and as shown in FIGS. 18-20, the disclosed sight 152 includes different internal configurations designed to help focus the user 2 on the display 255 of the mobile device 524. However, it should be understood that the scope 154 may include lenses and/or functions associated with a conventional scope in other embodiments. Alternatively, the scope 154 may be replaced with other known configurations of sights 152.

3) Cocking Assembly

As shown in FIGS. 1-23, the cocking assembly 180 is a multi-function component that is configured to allow the user to: move the crossbow 5 between three distinct states: (i) from a ready to use state, (ii) to a cocked state, and (iii) to a ready to fire state. In addition, the cocking assembly 180 is utilized to move the resistance assembly 210 from an undrawn or neutral position (see FIGS. 1-16 and 21-23) to a drawn position (see FIG. 17-20). The cocking assembly 180 is slidingly displaced along or slidingly engaged with the central member 70 and includes: (i) a hand grip 182 formed from a first or left grip member 184a, a second or right grip member 184b, and connecting elements 186, and (ii) a cradle 200 having both a first or left cradle element 202a and a second or right cradle element 202b. In the embodiment shown in the Figures, the left and right cradle elements 202a, 202b have a curvilinear configuration to facilitate engagement with the resistance assembly 210. Specifically, the left grip member 184a is configured to primarily be positioned: (i) on the left side of the central member 70, and (ii) below an extent of the central member 70, while the right grip member 184b is configured to primarily be positioned: (i) on the right side of the central member 70, and (ii) below an extent of the central member 70. The extents of the left and right grip members 184a, 184b that are positioned below the central member 70 are positioned adjacent to each other to form a U-shaped hand grip 182. The U-shaped hand grip 182 includes projections and recesses designed to facilitate engagement with an extent of the user's hand, when the user is using the crossbow 5. It should be understood that other embodiments of a hand grip 182 are contemplated by this disclosure. In an alternative exemplary embodiment, said U-shaped hand grip 182 may be enlarged to fully encircle said central member 70.

The left and right members 184a, 184b are coupled to one another using one or more connecting elements 186 to form the U-shaped hand grip 182. The connecting elements 186 are designed to be positioned substantially within the cocking assembly channel 74 and enable the hand grip 182 to slide forward and rearward within the channel 74 and in relation to the rail 72 and the frontal frame assembly 90. During movement from the ready to use state to the cocked state, the downward and rearward sliding movement of the hand grip 182 within the cocking assembly channel 74 causes the cradle 200 to move downward and rearward due to the fact that the left cradle element 202a extends from the left grip member 184a and the right cradle element 202b extends from the right grip member 184b. This downward and rearward movement of the cradle 200 causes the left and right cradle elements 202a, 202b to apply the downwardly directed force F (see FIGS. 9 and 18) on the serving segment 214 of the resistance element 212 to force the serving 214 into the serving receiver 60. This automatic application of the downwardly directed force F upon the serving 214 is highly desirable for enjoyment and operation of the crossbow 5 because it eliminates the need for the user 2 to manually apply a separate downwardly directed force on the serving 214 to forceably move it in the serving receiver 60. Nevertheless and as discussed above, this functionality is not mandatory for the crossbow 5 due to the fact that other configurations of the bow frame assembly 10 (including the trigger assembly 12) are contemplated by this disclosure. It should also be understood that the cradle 200 may act as a vibration damper, which is configured to absorb or redistribute vibrations or energies from the resistance element 212 after the bow 5 is fired and the resistance element 212 returns forward to the undrawn or neutral position.

4) Resistance Assembly

As shown in FIGS. 1-23, the resistance assembly 210 is directly connected to the left and right limbs 100a, 100b and includes: (i) a resistance element 212 with a serving segment 214 positioned between a first portion 216 having a first securing element 217, and a second portion 218 having a second securing element 219, (ii) a left securement housing 220a, and (iii) a right securement housing 220b. The configuration of the left and right securement housings 220a, 220b are designed to secure the ends of the resistance element 212 and in turn couple said resistance element 212 to the crossbow 5. The securement of the ends of the resistance elements 212 may be accomplished using any known mechanical means.

In the disclosed embodiment, securement of the ends of the resistance elements 212 is accomplished by a combination of structures that are internal to the left and right securement housings 220a, 220b and the first and second securing elements 217, 219. In particular, the left securement housing 220a is coupled to the left limb 100a and includes: (i) a removable cover 222a, (ii) a first internal retaining body 224a, (iii) a second internal retaining body 226a, and (iv) a retaining channel 228a formed between the first and second internal retaining bodies 224a, 226a. Similarly, the right securement housing 220b is coupled to the left limb 100b and includes: (i) a removable cover 222b, (ii) a first internal retaining body 224b, (iii) a second internal retaining body 226b, and (iv) a retaining channel 228b formed between the first and second internal retaining bodies 224b, 226b. Here, the first and second securing elements 217, 219 (e.g., a bead, ball-bearing, rod and pin, a knot), are positioned between the first and second internal retaining bodies 224a, 224b, 226a, 226b, while an extent of the resistance element 212 extends through the retaining channel 228a, 228b and towards the serving 214. When the first and second securing elements 217, 219 are positioned between the first and second internal retaining bodies 224a, 224b, 226a, 226b and the first and second portions 214, 218 of the resistance element 212 are positioned in the retaining channels 228a, 228b, the ends of the resistance element 212 within the left and right securement housings 220a, 220b because the size of the first and second securing elements 217, 219 are larger than the size of the retaining channels 228a, 228b. It should be understood that other methods of coupling the resistance element 212 to the limbs 100a, 100b.

The resistance element 212 may be a rope, cable, band, string, or tube with the serving 214 positioned between the first and second portions 216, 218. Preferably, the resistance element 212 is an elastically deformable rubber rube or band. The serving segment 214 is an extent of the resistance element 212 that is designed to contact the cradle 200 and be in sliding contact with the rail 72; thus, it is desirable to form the serving 214 from a material specifically designed to endure repeated sliding contact and engagement with the cradle 200 and rail 72. In the disclosed embodiment, the serving 214 is integrally formed extent of the resistance element 212. In another embodiment, said resistance element 212 may include a distinct serving portion 214 that is coupled between the first and second portions 216, 218. In this alternative embodiment, the serving 214 may have a different configuration then the configuration of the first and second portions 216, 218. For example, the first and second portions 216, 218 may have an elastic tubular configuration, while the serving 214 has a non-elastic cable configuration. As such, the resistance element 212 may have any combination of the following properties flexible, non-flexible, elastic, non-clastic, and/or elastically deformable.

5) Use of the Crossbow

The following disclosure focuses on the functional use of the crossbow 5 without describing the interactions between the crossbow 5 and the electronic device assembly 240. Specifically, the following disclosure describes moving the crossbow 5 from a ready to use state (see FIGS. 1-16 and 21-23), to a cocked state (see FIGS. 17-18), to a ready to fire state (see FIGS. 19-20), past firing and back to the ready to use state (see FIGS. 1-16 and 21-23). In the ready to use state, (i) the cocking assembly 180 (specifically, the hand grip 182) is in a forward position, (ii) the resistance element 212 (specifically, the serving 214) is in the undrawn position, (iii) the trigger assembly is in a first position, wherein the actuator spring 52 and trigger spring 28 apply biasing forces on the trigger 14 and actuator 40 in order to cause the serving engagement surface 44 to be parallel with the rail 72.

To move the crossbow 5 from the ready to use state to the cocked state, the user 2 applies a rearwardly directed force on the hand grip 182 of the cocking assembly 180. This rearwardly directed force causes: (i) the hand grip 182 and the cradle 200 to slide rearward along the central member 70 and downward in relation to the rail 72, (ii) the connecting elements 186 to slide within the cocking assembly channel 74, which is downwardly angled in relationship to the rail 72, (iii) the cradle 200 to engage and displace the resistance element 212 rearward along the rail 72 whereby the serving 214 moves rearward along the rail 72 and into the serving receiver 60, (iv) the resistance element 212 to move from an undrawn position to a drawn position. The user's rearwardly directed force applied to the hand grip 182 must be large enough to overcome a reactive force provided by the resistance element 212 to remain in the undrawn position.

To move the crossbow 5 from the cocked state to the ready to fire state, the user 2 applies a forwardly directed force on the hand grip 182 of the cocking assembly 180. This forwardly directed force causes the cradle 200 to disengage from the serving 214 and both the cradle 200 and the hand grip 182 to slide forward along the central member 70 and upward in relation to the rail 72. Once a frontal extent of the hand grip 182 is positioned adjacent to the riser 92, then the crossbow 5 is in the ready to fire state.

Finally, to move the crossbow 5 from the ready to fire state to the firing state and then returning to the ready to use state, the user applies a pulling force or an activation force on the trigger assembly 12. First, the user 2 applies a rearwardly directed force on contact surface 22 of the downwardly extending projection 20 of the trigger assembly 12. If this force is sufficient to overcome the biasing forces applied by a combination of the resistance assembly 212 and the actuator spring 52, the trigger 14 pivots clockwise about the trigger pivot pin 27. This clockwise pivotal movement in turn causes the upwardly extending projection 24 to move forward or towards a frontal extent of the crossbow 5 or the bow frame assembly 10. This forward movement causes the an extent of the interactive surface 26 of the trigger 14 to move from engaging an upper extent 54*a* of the trigger engagement surface 48 of the actuator 40 to engaging a lower extent 54*b* of the trigger engagement surface 48. Moving from the upper extent 54*a* to the lower extent 54*b* causes the main body 42 of the actuator 40 to pivot clockwise about actuator pivot pin 50. This clockwise pivotal movement causes an extent of the serving engagement surface 44 to elevate. This elevation of the serving engagement surface 44 forces the serving 214 of the resistance assembly 212 to overcome the serving retention element 62. Finally, once the serving 214 of the resistance assembly 212 overcomes the serving retention element 62, the resistance assembly 212 is released from the serving receiver 60 and rapidly moves towards the frontal extent of the bow 5 where the serving segment 214 of the resistance assembly 212 is engaged and retained by the cradle 200 in the ready to use state. In other words, this rapid movement of the release of the resistance assembly 212 corresponds to firing the crossbow 5, therefore moving the crossbow 5 from the ready to fire state past firing to the ready to use state. Once the ready to use state has been reached, the process can be repeated to allow the user 2 to repeat the process explained above to repeatedly fire simulated arrows with the crossbow 5.

6) Electronic Device Assembly

FIGS. 23-30 focus on the electronic device assembly 240, comprised of a mobile device mount 252, a mobile device 254, and a crossbow application or "app" 256. In particular, the mobile device mount 252 enables the user 2 to mount the mobile device 254 to the bow frame assembly 10 of the AR/VR crossbow system 5. The mounted mobile device 254 operates with the crossbow application or "app" 256 to simulate real life archery scenarios, such as hunting and/or Olympic target shooting.

a. Electronic Device Mount

The bow frame assembly 10 includes one or more attachment ports 248, wherein one of these attachment ports 248 is a mount port 250. Here, the mount port 250 includes a threaded receiver (not shown). The threaded receiver accepts an extent of a bow frame assembly 10, which is used to releasably couple the mobile device mount 252 to the bow frame assembly 10. It should be understood that other types of mechanical couplers may be used instead of a threaded connector, such as a pin and socket, a quarter-turn connector, bayonet connector, etc. The mount port 250 is positioned in the bow frame assembly 10 and specifically in the riser 92. This position places allows for the mobile device 254 to simulate what the user 2 would see through a traditional crossbow sight.

FIGS. 1, 4-6, 8, and 23 show the mobile device mount 252. The mount 252 is configured to engage and grip the periphery of the mobile device 254. The mobile device mount 252 is comprised of a mounting arm 300 and a mobile device holder 302. The mounting arm 300 is configured to secure the mobile device holder 302 to the bow frame assembly 12. Meanwhile, the mobile device holder 302 is comprised of two elongated rectangular bodies, wherein each elongated body includes a projection 318 designed to engage and grip the periphery of the mobile device 254. In particular, the projection 318 includes a recessed area 319 that accepts an extent of the mobile device 254. Thus, as shown in FIG. 8, part of the projection 319 is disposed over the front edge of the mobile device 254. Here, the first elongated rectangular body 320 is configured to be disposed within the second elongated rectangular body 322 and are coupled to one another by an internal spring 324. To remove an extent of the first elongated body 320 from the second elongated body 322 the user 2 must pull the first elongated body 320 away from the second elongated body 322 with enough force to overcome the inward biasing force exerted by the internal spring 324. Once the user 2 has removed an extent of the first elongated body 320 from the second elongated body 322, the user 2 may place the mobile device 254 between the projections 318. After the mobile device 254 is in place, the user 2 can release the first elongated body 320 from the second elongated body 322. Once released, the mobile device 254 will be secured to the mobile device mount 252 by the tension provided by the internal spring 324. It should be understood that the mobile device mount 252 is made from injection molded plastic and that foam cushioning elements may be placed in locations where the mobile device mount 252 may make contact with the mobile device 254.

The design of this mount 252 ensures that it is capable of mounting different size mobile devices 254 to the bow frame assembly 10. For example, the mount 252 can receive mobile devices 254 with a diagonal measurement of 4.75 inches to 12 inches. It should be understood that most of today's cellular enabled mobile devices fall within this range (e.g., iPhone 7 is approximately 5.75 inches or Galaxy S8+ is approximately 7 inches). It should be understood that the mount 252 may be configured to accept mobile devices that are smaller (e.g., 4 inches) or larger devices (e.g., 14 inches). In alternative embodiments, the mobile device mount 252 may be comprise of different mounts, such as suction cups, straps, or other mechanical coupling solutions that secure the mobile device 254 to the bow 10.

b. Crossbow Application

To use the crossbow application 256, the user 2 first obtains a mobile device 254, which has a MEMS gyroscope, a microphone, and display 255. These features are typically found in today's phones, such as the Apple iphone 5 or Samsung Galaxy 5. It should be recognized that other electronic devices that have a display 255 and similar sensors may be used instead of a phone, such as a tablet. Further, it should be understood that a mobile device 254 or other electronic devices may have additional sensors or modules that may include a speaker, magnetometer, an accelerometer, a proximity sensor, barometer, an ambient light sensor, a dot projector, LiDAR sensor, cameras (e.g., a rear facing camera, a front facing camera, and/or an infrared camera), wireless modules (e.g., cellular, Wi-Fi, Bluetooth, WiMAX, HomeRF, Z-Wave, Zigbee, THREAD, RFID, NFC, and/or etc.), or location sensors (e.g., Global Positioning System ("GPS"), GLONASS, Galileo, QZSS, iBeacon, and/or etc.). These additional sensors and/or modules may be utilized in alternative embodiments that are discussed below.

Once the user 2 obtains the mobile device 254, the user 2 installs the crossbow application 256. This is typically done by downloading and installing the crossbow application 256 from an app store, such as Apple's App Store or Google Play. It should be recognized that the user 2 may download the crossbow application 256 onto the phone 254 from other locations, such as a local computer or another web-based server. In alternative embodiments, the AR/VR crossbow system 248 may include a mobile device 254, which has the crossbow application 256 preinstalled.

Figure 24:
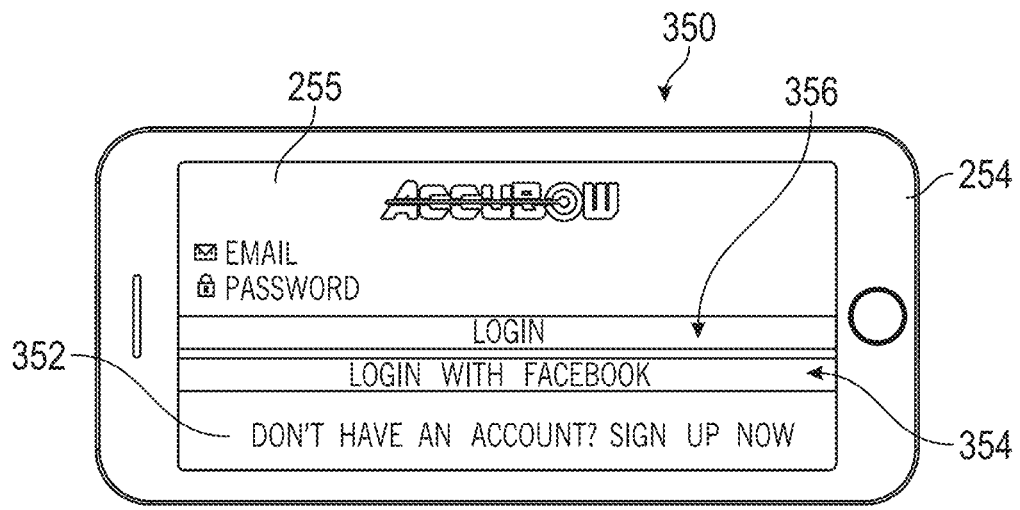
FIG. 24 is a frontal view of the mobile device of the AR/VR crossbow system shown in FIG. 1 with the crossbow application installed and displaying a login screen.

After the crossbow application 256 is downloaded, installed, and running, the user 2 may first encounter a login page 350, shown in FIG. 24. Here, the login page 350 may allow the user 2 to create an account 380. If the option to create an account 352 is selected, the crossbow application 256 will bring the user 2 to another screen, which will request the user 2 to input information about them (e.g., name, screen name, password, and/or etc.). Instead of the user 2 inputting information to create an account, the crossbow application 256 can generate an account for the user 2 based on information pulled from their Facebook profile 354. Regardless of what method is chosen by the user 2 to generate the account, the user 2 will be prompted to login 356 to access the features within the crossbow application 256. This enables the crossbow application 256 to keep track of the user's settings and game progress. For example, the crossbow application 256 may keep track of: 1) high scores, 2) purchases, 3) equipment upgrades, and/or 4) user settings (e.g., height of the user 2, arrow speed, or sight setup). In an alternative embodiment, the crossbow application 256 may allow the user 2 to access the features within the crossbow application 256 using a guest account. In a further embodiment, the user 2 may not be required to create an account to access the features within the crossbow application 256. However, it should be understood that if a guest account or no account is used, only a subset of the crossbow application's features may be available to the user 2.

The user's account may also allow the user 2 to access a social media or online community section of the crossbow application 256. This social media or online community allows fellow account holders the ability to discuss upcoming training challenges or hunting competitions on message boards or to post pictures of their newly captured high scores. This online community may include some or all of the following features: 1) message boards/news feed, 2) friending, 3) profile space, 4) timeline of user's past events, 5) ability to like or react to a user's post, 6) comment on a user post, 7) send a message, 8) create private messaging groups, 9) calendar events, 10) share a user's physical location, 11) share photos or videos, and/or 12) status updates. Additionally, the online community may also include other well-known features that are in use on other social media websites, such as Facebook, Twitter, MySpace, Orkut, Hi5, Mixi, QZone, Renren, Frindster, or etc.

After the crossbow application 256 is downloaded, installed, running, and the user 2 has logged in 356, the user 2 is prompted to enter their personal specifications. In particular, the user 2 may be asked to enter their height. The height range accepted by the crossbow application 256 may be between 2 and 8 feet. If the user 2 tries to enter a height out of this range, the crossbow application 256 will either: 1) provide a warning message to the user 2 that this height is out of range or 2) provide an error message to the user 2 requesting the user 2 to enter a height that is within range. The crossbow application 256 utilizes the height of the user 2 to adjust the height of the simulated targets 276 displayed within the application 256.

Additionally, the user 2 may be asked to enter their arrow speed. The arrow speeds accepted by the crossbow application 256 may be between 50 and 500 feet per second. If the user 2 tries to enter an arrow speed out of this range, the crossbow application 256 will either: 1) provide a warning message to the user 2 that this arrow speed is out of range, or 2) provide an error message to the user 2 requesting the user 2 enter an arrow speed that is within range. The crossbow application 256 utilizes the arrow speed of the user 2 to adjust the flight path of the simulated arrow 282 within the application 256. This helps make the crossbow application 256 closely approximate the shooting arrows using a traditional crossbow.

Further, the user 2 may be asked to set up their virtual sight 258. The number of pins 264 a user 2 may include in their virtual sight 258 may be between 1 and 10 pins 264. If the user 2 tries to enter a number of pins 264 out of this range, the crossbow application 256 will either: 1) provide a warning message to the user 2 that this number of pins is out of range or 2) provide an error message to the user 2 requesting the user 2 enter a number of pins within range. Once the user 2 enters the number of pins 264, the user 2 is then prompted to enter the distances that correspond to each pin 264. For example, if the user 2 desires to set up a virtual sight 258 with three pins 264, then the user 2 may set the first pin at 20 feet, the second pin at 30 feet, and the third pin at 40 feet. This helps make the crossbow application 256 closely approximate the user's 14 traditional crossbow sight.

Alternatively, the crossbow application 256 may allow the user 2 to enter only a subset of the personal specifications (e.g., height, arrow speed, or pins contained within the user's sight). For example, the crossbow application 256 may only allow the user 2 to enter their height and not their arrow speed or the pins 264 contained within the virtual sight 258. In this case, the crossbow application 256 may set a predefined arrow speed and predefined number of sight pins 264. This predefined arrow speed is preferably set between 135 and 335 feet per second, more preferably between 260 and 310 feet per second, and most preferably between 275 and 295 feet per second. The predefined number of sight pins 264 is preferably set between 1 and 6 pins 264, more preferably between 1 and 4 pins 264, and most preferably between 1 and 3 pins 264. Additionally, the crossbow application 256 may allow the user 2 to purchase or earn the ability to enter additional personal specifications. For example, the user 2 may be able to enter their arrow speed after completing a predefined number of challenges.

In a further embodiment, the crossbow application 256 may not allow the user 2 to enter any personal specifications. In this embodiment, the crossbow application 256 may set a predefined arrow speed, as discussed above, a predefined number of sight pins 264, as discussed above, and a predefined height for the user 2. Specifically, the predefined height of the user 2 is preferably set between 5.25 feet and 6.75 feet, more preferably between 5.5 and 6.50 feet, and most preferably between 5.75 and 6.25 feet.

Figure 25:
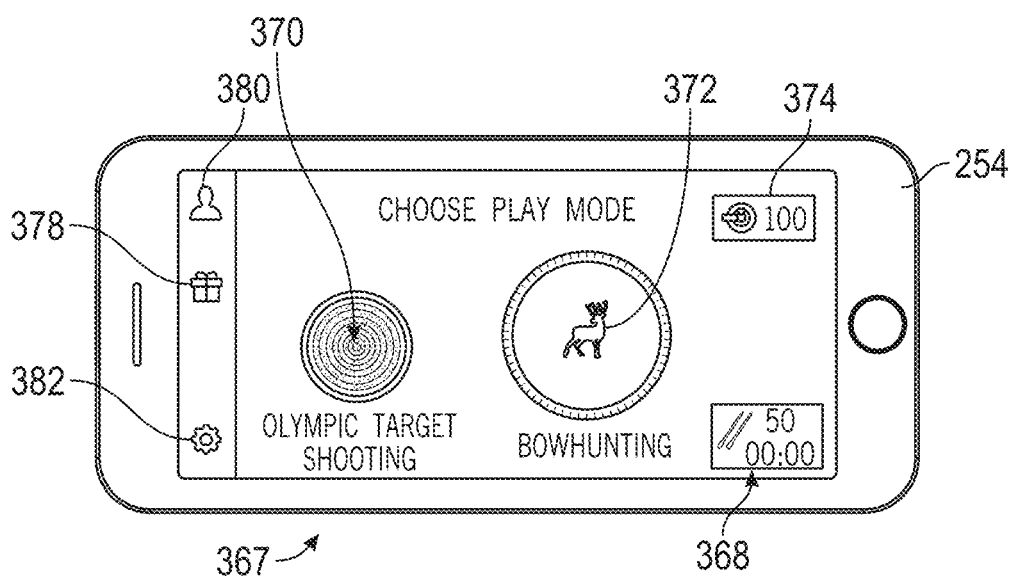
FIG. 25 is a frontal view of the mobile device of the AR/VR crossbow system with the crossbow application installed and displaying various simulated real-life archery scenarios.

After the crossbow application 256 is downloaded, installed, running, the user 2 is logged in 356, and the user 2 has entered their personal specifications, the user 2 may land on a page 367 that prompts the user 2 to select an archery training scenario, TS. For example, the available archery training scenarios TS may include a hunting scenario 370 or Olympic target shooting 372, as shown in FIG. 25. It should be understood that other archery training scenarios may be available within the crossbow application (e.g., trick shooting scenario, augmented reality archery training scenario, augmented reality archery challenge, virtual reality archery challenge, or coaching scenario). In addition, to displaying various available archery training scenarios, the page 367 also displays the amount of money the user 2 has in their account to purchase game upgrades 374 and the number of arrows 268 owned by the user 2.

Further, the page 367 includes the links to a store 378, the user's account 380, and the user's personal specifications 382. Upon selecting the store link 378, the user 2 may purchase additional arrows or other upgrades (e.g., no advertisements, high performance bow, or special arrows). Instead, if the user 2 selects the user's account link 380, the user 2 can view their account settings (e.g., screen name, most played level, and their high scores). Alternatively, if the user 2 selects the user's personal specifications link 382, the user 2 may view or alter their personal specifications, which may include height, arrow speed, and/or number of sight pins 264.

Figure 26:
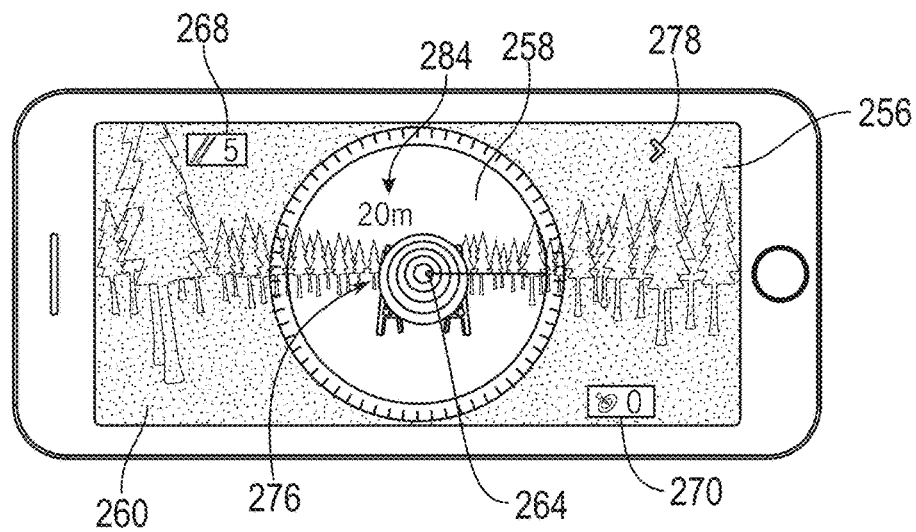
FIG. 26 is a frontal view of the mobile device of the AR/VR crossbow system with the simulated real-life archery scenario active on a mobile device.
Figure 27:
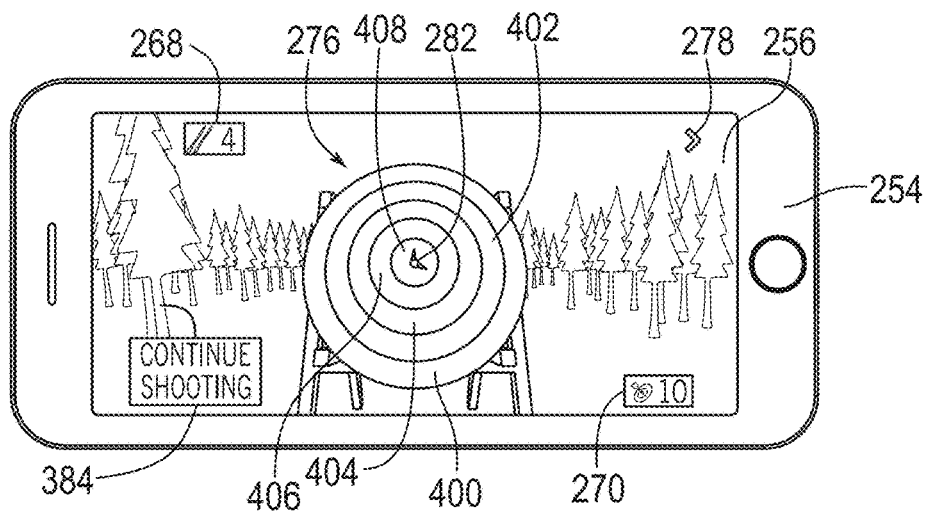
FIG. 27 is a frontal view of the mobile device of the AR/VR crossbow system, showing a simulated arrow hitting a simulated target within the simulated real-life archery scenario.

After the archery training scenario TS is selected, the crossbow application 256 loads the appropriate graphics onto the screen 255 of the mobile device 254. FIG. 26-27 show an example of the graphics that may be loaded on the screen 255 for an Olympic target shooting scenario 372. Specifically, the displayed graphics simulate what the user 2 would see while at an archery range with a traditional bow capable of firing an arrow at a target. First, the archer's field of view 260 is defined by using different colors to differentiate between what is contained within the virtual sight 258 and what is contained outside of or beyond the virtual sight 258 in the broader field of view 260. Second, distance dots or pins 264 may be displayed within the virtual sight 258. Third, the crossbow application 256 displays session performance metrics including the number of arrows 268 the user 2 has left and the number of points 270 the user 2 has accumulated. Fourth, the crossbow application 256 displays the distance 284 to the simulated target 276. Finally, a link or button 278 to return to the main menu. It should be understood that more or less information may be displayed on the screen 255. For example, additional information that may be displayed includes: 1) links or buttons to select different types of arrows, 2) current round level, 3) the difficulty of the round, 4) timer, 5) other user's scores, 6) heart rate of the user 2, or—etc.

After the graphics are loaded, the user 2 can aim the bow 10 in different directions searching for a simulated target 276. Because the mobile device 254 is mounted to the AR/VR crossbow system 5, the angle and direction of the mobile device 254 will approximate the angle and direction of the bow 10. Thus, when the user 2 moves the bow 10 to find a simulated target 276, the mobile device 254 senses this movement and updates the graphics on the screen 255. In other words, the crossbow application 256 creates a virtual reality training environment by simulating what the user 2 would see while trying to acquire a target on a practice range with the use of a bow capable of firing an arrow.

Specifically, the process of loading and updating the graphics on the mobile device 254 is described by the following process. First, the mobile device 254 uses its internal magnetometer to determine an initial reference point, including direction and pitch, of the mobile device 254. The crossbow application 256 utilizes this initial reference point in connection with the user's height to determine where to place the simulated target 276. Here, the simulated target 276 is generated approximately 40° degrees laterally from the initial reference point and at the same vertical level as the mobile device 254.

Once the initial reference point is determined, the crossbow application 256 utilizes the MEMS gyroscope to update the graphics displayed on the screen 255. In particular, the MEMS gyroscope measures the delta between the initial reference point and the current direction (e.g., direction and pitch) of the mobile device 254. This delta is then received and analyzed by the crossbow application 256. In response, the graphics rendered on the screen 255 in the crossbow application 256 are moved by the delta. For example, if the user 2 moves the mobile device 254 40° degrees to the left and decreases the pitch by 5° degrees, the crossbow application 256 renders graphics located in the virtual target range that are 40° degrees to the left and decreases the pitch by 5° degrees.

In alternative embodiments, the crossbow application 256 may only utilize the magnetometer, without the MEMS gyroscope, to determine the direction and pitch of the mobile device. Instead of determining the initial reference point and then calculating deltas between the reference point and the current location, the mobile device 254 may just query the magnetometer for the direction and pitch of the mobile device during each frame. This embodiment may be preferred if the mobile device 254 does not have a MEMS gyroscope or other like sensors. In further embodiments, the crossbow application 256 may use both the magnetometer and the MEMS gyroscope to further refine the determination of the mobile device's location in physical space. Finally, in other embodiments, the crossbow application 256 may also utilize the accelerometer and/or barometer in connection with the magnetometer and/or MEMS gyroscope to even further refine the determination of the mobile device's location in physical space. A more accurate physical location will allow a more accurate rendering of the graphics in virtual space.

Once the user 2 acquires and locks—in a simulated target 276 (i.e., the simulated target 276 shown in FIGS. 26-30), the user 2 aims at the simulated target 276 by placing the sight pin 264 on the simulated target 276. The user 2 then waits for an optimal time, which can be predetermined by the app 256 or be a function of the simulated target's 276 presence in the virtual sight 258, to release the resistance element 212. Once this optimal time has been reached, the user 2 releases the resistance element 212 by actuating the trigger assembly 12.

c. System for Determining when the Arrow is Fired

The resistance element 212 will then make contact with the cradle 200, which in turn produces a sound. This sound is recorded by the microphone that is integrated into the mobile device 254. If the level of this sound is over a predefined level, a simulated arrow 282 will be fired within the crossbow application 256. If the level of this sound is not over a predefined level, a simulated arrow 282 will not be fired within the crossbow application 256. In other words, similar to the firing of an arrow by releasing a bow string on a traditional crossbow, a simulated arrow 282 is fired in the crossbow application 256 when the resistance element 212 is released. Also, similar to how an arrow will not be fired from a traditional crossbow if the bow string is not drawn back to a certain extent, the simulated arrow 282 will not be fired in the crossbow application 256 unless the resistance element 212 is drawn back far enough to generate a sound (i.e., the contact of the resistance element 212 with the cradle 200) that is greater than a predetermined threshold.

This predetermined sound level is preferably above 50% of the max volume the microphone can record, more preferably above 80% of the max volume the microphone can record, and most preferably above 90% of the max volume the microphone can record. These sound levels help ensure background noise or ambient noise does not cause the simulated arrow 282 to be fired without the release of the resistance element 212. In other embodiments this predetermined sound level is preferably above 61 dBs, more preferably above 76 dBs, and most preferably above 85 dBs It should be understood that other sound levels may be used.

The sound generated from the resistance element 212 striking the cradle 200 may not have a unique sound profile. If this is the case, a simulated arrow 282 will be fired in the crossbow application 256 based only on the level of the sound generated by the contact of the resistance element 212 and the cradle 200. In other embodiments, the contact of the resistance element 212 with the cradle 200 may have a unique sound profile. For example, the sound profile may be equivalent to a specific note (e.g., C, D, E, F, G, A, B). In this embodiment, the sound profile along with the sound level may be used to determine whether a simulated arrow 282 should be fired within the crossbow application 256. Instead of using both the sound level and the sound profile, just the sound profile may be used in an alternative embodiment.

In another embodiment, different sensors contained within the mobile device 254 may be used to determine when a simulated arrow 282 was fired. Instead of using the microphone, the mobile device 254 may use the accelerometer to measure the vibration caused by the contact between the resistance element 212 with the cradle 200. If the vibration level is over a predefined level, a simulated arrow 282 will be fired within the crossbow application 256. If the vibration level is not over a predefined level, a simulated arrow 282 will not be fired within the crossbow application 256. Alternatively, the mobile device 254 may use the barometer to measure the pressure caused by the contact between the resistance element 212 with the cradle 200. If the pressure level is over a predefined level, a simulated arrow 282 will be fired within the crossbow application 256. If the pressure level is not over a predefined level, a simulated arrow 282 will not be fired within the crossbow application 256. In a further embodiment, either: 1) a LIDAR sensor, 2) forward facing camera, or 3) forward facing infrared camera may be used to determine the firing of a simulated arrow 282. In particular, these sensors can detect the rapid forward movement of the resistance element 212, upon which will cause the simulated arrow 282 to be fired within the crossbow application 256. In another embodiment, a sensor (e.g., pressure, motion, proximity, accelerometer, LiDAR, etc.) can be embedded in an extent of the bow 5 may be used to determine the firing of a simulated arrow 282. For example, said sensor may be embedded in an extent of the trigger assembly 12, rail 72, and/or cradle 200. Alternatively, the sensor may be embedded in an extent of the resistance element 212. In particular, these sensors can detect the forward movement of the resistance element 212, the actuation of the trigger, or both, upon which will cause the simulated arrow 282 to be fired within the crossbow application 256. It should be understood that any combination of these sensors may be used in determination of when a simulated arrow 282 is fired.

As discussed above, the crossbow application 256 may set a predefined arrow speed or may allow the user 2 to enter their arrow speed. In certain embodiments, the AR/VR crossbow system 248 may fire the simulated arrow 282 at the predetermined speed regardless of how much force is generated above a predefined threshold. For example, irrespective of whether there is 10 pounds on the resistance member or 70 pounds on the resistance member, the simulated arrow 282 will fly at the same speed as long as the sound generated from the contact between the resistance element 212 and the cradle 200 is above the predefined threshold (e.g., 90% of the max volume the microphone can record). In contrast, other embodiments of the AR/VR crossbow system 248 may adjust the arrow speed depending on force generated above a predefined threshold. For example, a full draw of the resistance element 212, set to 30 pounds, may fire the simulated arrow 282 at 300 feet per second. Meanwhile, a full draw of the resistance element 212, set to 70 pounds, may fire the simulated arrow 282 at 500 feet per second. Nevertheless, it should be understood that a predefine threshold must be met before the simulated arrow 282 is fired. This will help ensure that the user 2 intended to fire the simulated arrow 282.

Once the crossbow application 256 determines that a simulated arrow 282 has been fired, the application 256 must also determine what direction the simulated arrow 282 was fired. Both the bow 10 and the mobile device 254 are pointed in the same direction due to the fact the mobile device 254 is mounted to the bow 10. Thus, the crossbow application 256 can use the direction the mobile device 254 was pointing as a proxy for the direction the bow 10 is pointing. Here, the crossbow application 256 records in a log the direction (e.g., horizontal, vertical, and rotational) the mobile device 256 was facing during every frame. During one second approximately 60 frames occur. To minimize the burden on the mobile device 254, the crossbow application's log may only store the directions measured during each frame that occurred in the last 5 minutes (i.e., about 18,000 frames), more preferably during the last 2 minutes (i.e., about 7,200 frames), and most preferable during the last 30 seconds (i.e., 1,800 frames). The crossbow application 256 analyzes this log to determine the direction the mobile device 254 was pointing before and after the simulated arrow 282 was fired. In particular, the crossbow application 256 determines each direction the mobile device 254 was pointing during the six frames prior to the firing of the simulated arrow 282 and the direction the mobile device was pointing one frame after the simulated arrow 282 was fired. Then the crossbow application 256 averages these directions together (e.g., six direction prior to firing and the one direction after firing) to determine the direction the bow 10 was pointing when the simulated arrow 282 was fired. It should be understood that more or less frames may be analyzed. For example, the crossbow application 256 may analyze between 20-3 frames prior to the firing of the simulated arrow 282 and 10-0 frames after the firing of the simulated arrow 282.

Once the crossbow application 256 determines that a simulated arrow 282 has been fired and its direction, the crossbow application 256 displays its flight path on the screen. In one embodiment, this flight path may be a straight line or linear. In other words, exactly where the user 2 aims the pin 264 is where the simulated arrow 282 will land. In this embodiment, the crossbow application 256 does not apply any gravitational force or wind.

d. Application Screens

FIGS. 26-27 show a simulated target 276 displayed in an Olympic target shooting scenario 372. In particular, the Olympic target is shown a simulated target 276 with five concentric circles. In this scenario, one point will be awarded for an arrow that lands in the outermost ring 400, three points for an arrow that lands in the next outermost ring 402, six points for an arrow that lands in the next outermost ring 404, seven points for the next outermost ring 406, and ten points for the innermost ring. Once the flight path of the simulated arrow 282 is displayed on the screen 255, the crossbow application 256 will display where the simulated arrow 282 hit the simulated target 276, as shown in FIG. 27. Here, the simulated arrow 282 hit the innermost circle or hit a bullseye 406. In response to hitting this location with the simulated arrow 282, the crossbow application awarded the user ten points. The user 2 will then must press the "continue shooting" button 384 on the lower left side of the display 255. Once the "continue shooting" button 384 is pressed, the user can fire another arrow.

Figure 28:
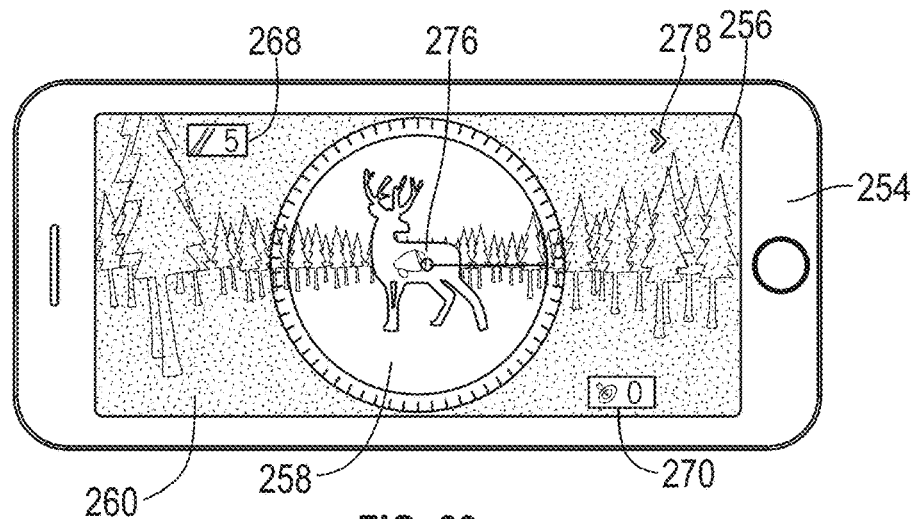
FIG. 28 is a frontal view of the mobile device of the AR/VR crossbow system with the alternative embodiment of a simulated real-life archery scenario active on a mobile device.
Figure 29:
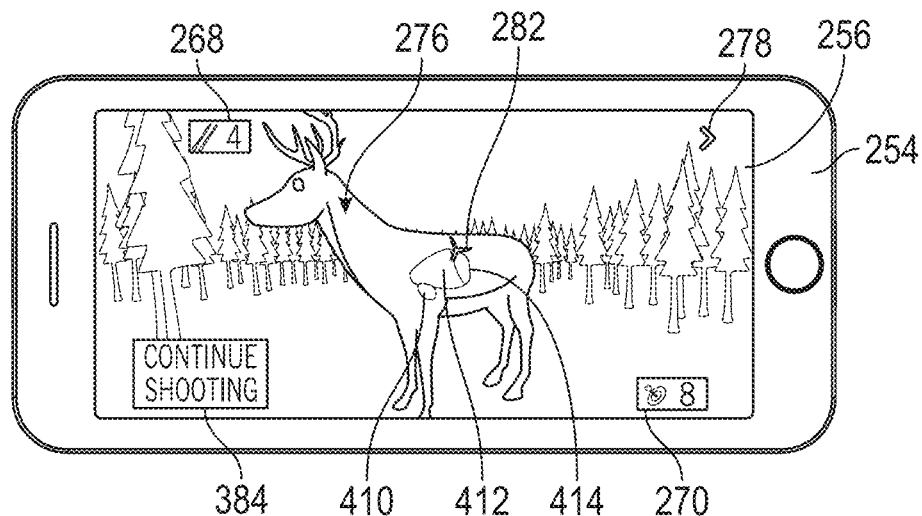
FIG. 29 is a frontal view of the mobile device of the AR/VR crossbow system, showing a simulated arrow hitting a simulated target within the alternative embodiment of a simulated real-life archery scenario.
Figure 30:
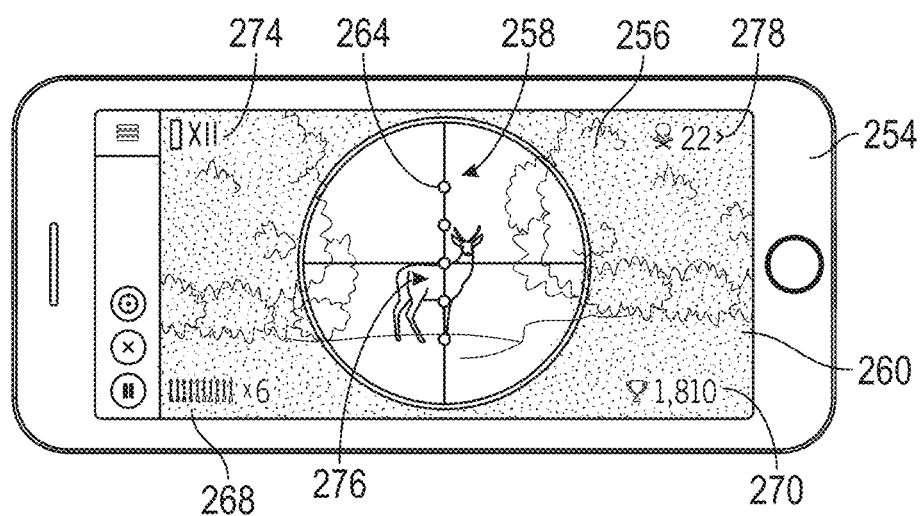
FIG. 30 is a frontal view of the mobile device of the AR/VR crossbow system with an alternative embodiment of a simulated real-life archery scenario active on a mobile device.

FIGS. 27-30 show a simulated target 276 (e.g., a deer) displayed in a hunting scenario 370. In this scenario, once the user places a pin 264 over the deer, the exterior of the deer becomes transparent and displays vital organs that an archer should aim for when hunting a deer with a traditional bow that is capable of firing an arrow. Specifically, the heart, lungs, and liver are shown in FIGS. 28-29. Here, the crossbow application 256 will award the user with twelve points for an arrow that lands in the heart 410, eight points for an arrow that lands in the lungs 412, and four points for an arrow that lands in the liver 414. Once the flight path of the simulated arrow 282 is displayed on the screen 255, the crossbow application 256 will display where the simulated arrow 282 hit the simulated target 276, as shown in FIG. 29. Here, the simulated arrow 282 hit the lungs 412. In response to hitting this location with the simulated arrow 282, the crossbow application awarded the user eight points. The user 2 then must press the "continue shooting" button 384 on the lower left side of the display 255. Once the "continue shooting" button 384 is pressed, the user can fire another arrow.

Upon collecting sufficient points 270, the user 2 is allowed to move to a later round 274 in the archery training scenario. In later rounds 274, the simulated targets 276 may get smaller or move more quickly—be more evasive. Or the surrounding terrain may cause the simulated target 276 to be more difficult to sight or provide the simulated target 276 with greater cover. For example, the simulated targets 276 may move to the right or to the left of the screen 255 or the simulated targets 276 may move towards or away from the user 2. Other examples of simulated targets 276 may include objects (e.g., bottles, cans, hoops, or etc.) or other animals (e.g., elk, bears, moose, caribou, bighorn sheep, pronghorn, boars, javelin, zombies, or etc.)

e. Alternative App Settings and/or Functionality

In an alternative embodiment, the crossbow application 256 applies a gravitational force on the simulated arrow 282. To apply this gravitational force, the crossbow application 256 must know the weight of the simulated arrow 282. This weight may be predefined and is preferably between 250 and 600 grains, more preferably between 350 and 500 grains, and most preferably between 375 and 425 grains. Alternatively, the user 2 may set this arrow weight or the user 2 may be able to purchase arrows 282 having different weights. For example, the user 2 may select a heavier arrow 282 weight while hunting larger animals. In this example, the crossbow application 256 may award more points for a shot that is slightly off target when using a heavier arrow 282 in comparison to a shot in the same location with a lighter arrow 282. Further, in this example, the crossbow application 256 may require that the user 2 take into account the use of a heavier arrow 282 when aiming at the simulated target 276. Regardless, of which arrow 282 weight is used, the application 256 of a gravitational force will cause the arrow 282 to fall towards the ground as it moves towards the simulated target 276. Thus, in this embodiment, the user 2 will have to account for this gravitational force when aiming at the simulated target 276. One way the crossbow application 256 may aid the user 2 in accounting for this gravitational force is by allowing the user 2 to set up multiple pins 264 within their virtual sight 258, which each pin 264 may be set at a different distance. Thus, the user 2 may use the first pin to aim at a simulated target 276 that is 20 meters away, while using a second pin to aim at a simulated target 276 that is 30 meters away.

In an alternative embodiment, flight path of the simulated arrow 282 may be affected by simulated wind. In this case, the direction and the wind speed may be determined by the crossbow application 256. For example, the wind may be blowing from the north at 10 miles an hour. This information is displayed to the user 2 on the screen of the mobile device 254, which in turn tells the user 2 that they have to take this into account when aiming at the simulated target 276. Additionally, the speed and direction of the wind may be preprogramed into certain levels to increase their difficultly. Alternatively, the user 2 may set the wind difficulty level to a value between 0 and 10, with 10 being the hardest (i.e., fastest wind speed and most difficult direction based on the location of the simulated target 276).

It should be understood that different combinations of these features may be utilized by the crossbow application 256. For example, the application 256 may not apply a gravitational force, but may apply simulated wind. Or, the application 256 may just apply gravitational force. Or, the application 256 may apply gravitational force and wind. It should also be understood that other external forces, such as air temperature, elevation, or etc., may be utilized.

f. AR Version of the App

In another embodiment, the crossbow application 256 may include an augmented reality archery training scenario. In this training scenario, the crossbow system 5, such as the mobile device, may include a rear facing camera to capture the overall environment of the user. The application 356 process this environment information and then displays it on the screen of the mobile device 254 along with simulated targets 276 that are generated within the crossbow application 256. In other words, the mobile device 254 may display the user's room with a simulated target 276 (e.g., a deer) in the room. Alternatively, the crossbow application 256 may analyze the user's environment and find appropriate simulated targets 276 (e.g., bottles, cups, etc.). Once a simulated target 276 is found, the crossbow application 256 will display a simulated target 276 ring around the item and assign a point value to the simulated target 276. Like other scenarios that have been described above, this scenario will use the mobile device's 252 MEMS gyroscope to analyze the direction of the bow 10 and the microphone to determine when the simulated arrow 282 is fired within the crossbow application 256. However, unlike other scenarios, this scenario will use the rear facing camera to display the user's environment. It should also be understood that other sensors (e.g., magnetometer, an accelerometer, barometer, a dot projector, LiDAR sensor, and/or cameras) may be used in addition or instead of the MEMS gyroscope to determine the direction of the bow 10 or when the simulated arrow 282 should be filed.

g. Other Versions of the App

The crossbow application 256 may include other archery training scenarios, such as augmented reality archery training scenario, virtual reality archery challenges, or an augmented reality archery challenge. In another embodiment, the crossbow application 256 may include an augmented reality archery competition. Unlike the virtual reality archery competitions, this augmented reality archery competition takes into account the participants physical location. Thus, participants must be physically located within the same geographical area (e.g., 25 miles) to challenge one another. Specifically, in these augmented reality competitions, a map is shown to the user that displays: 1) the user's location, 2) competitors' location, and 3) virtual archery simulated targets 276. The user 2 and the competitors (collectively, participants) can move their physical location, which in turn moves there augmented reality location. The participants may move towards simulated targets 276 and when in range, the participants may engage virtual simulated targets 276. Points are awarded based on the number of simulated targets 276 engaged by each participant; thus, the participant with the most points at the end of the competition wins.

This game mode uses the same mechanics of how the graphics are updated, the determination of whether a simulated arrow 282 was fired, and the flight path of the arrow 282 as described above. However, this game mode also takes into account the user's physical location. This is done by first determining the physical location of each of the participant's mobile devices 254 by using the location sensors (e.g., GPS, GLONASS, Galileo, QZSS, iBeacon, and/or etc.) that are built into the mobile devices 254. The mobile devices 254 may also use other sensors (e.g., barometer and/or magnetometer) to increase the accuracy of the determined locations. This information is then sent wirelessly to the backend servers of the crossbow application 256. These servers utilize the location information of all participants in connection with other challenge settings (e.g., difficulty of the challenge) to then generate simulated targets 276. These simulated targets 276 are then displayed on every participant's mobile device 254 based on the map overlay. A participant may then attempt to approach a simulated target 276 by moving their physical location towards the simulated target 276, which in turn moves their virtual location towards the simulated target 276. Once in range, the participant may try and engage the simulated target 276. The crossbow application 256 keeps track of the simulated targets 276 the participants engaged and their associated points. Once the competition has ended, the crossbow application 256 determines which participant is the winner by comparing the participant's point totals to one another. This augmented reality competition tries to closely approximate a real life hunting competition, where participants are required to track and engage simulated targets 276.

In another embodiment, the crossbow application 256 may include a virtual reality archery challenge. The game mode allows the user 2 to challenge other account holders to a virtual reality archery competition, regardless of each user's physical location. In these challenges, the two challengers may enter a virtual archery range, where each user 2 takes turns to see who can score the most points. After the challenge has concluded, the results of the challenge may be posted on a message board for other users 14 to see. This game mode uses the same mechanics of how the graphics are rendered/updated, the determination of whether a simulated arrow 282 was fired, and the flight path of the arrow 282 as described above.

h. Alternative System Configurations

FIG. 31 shows a second embodiment of the crossbow 1005. For sake of brevity, the above disclosure in connection with crossbow 5 will not be repeated below, but it should be understood that across embodiments like numbers that are separated by 1000 represent like structures. In this embodiment, the cocking assembly 1180 has been omitted. Instead, the user will apply a rearwardly directed force on the resistance element 212 using their hands. It should be understood that other known cocking mechanisms may be utilized. For example, a lever based cocking mechanism may be utilized instead of the disclosed assembly.

Instead of using the MEMS gyroscope, this scenario may use other sensors that are built into the mobile device 254, such as the accelerometer, to measure the movement of the bow 10 during the predetermined amount of time. Further, this scenario may use a forward facing camera to start the countdown of the predetermined amount of time. In particular, the forward facing camera detects when the user 2 has fully drawn back the resistance element 212 by taking pictures of the user 2 and analyzing the angle of the resistance element 212 and/or proximity of the resistance element 212 to the user's 14 face. Alternatively, this scenario may use: 1) LiDAR sensor or 2) the forward facing infrared camera and the dot projector, instead of the forward facing camera. Both of these alternative sensors can detect and analyze the distance the user 2 has drawn the resistance element 212.

FIG. 32 shows a third embodiment of the crossbow 2005. For sake of brevity, the above disclosure in connection with crossbow 5 will not be repeated below, but it should be understood that across embodiments like numbers that are separated by 2000 represent like structures. In this embodiment, the sight assembly 140 has been omitted and the display 255 associated with the mobile device 254 may not be utilized (however, the mobile device 254 is still utilized and attached to the bow frame assembly 10). Instead, a display located within a virtual reality headset or an external display (e.g., monitor or television) may be utilized. In this embodiment, the sensors within the mobile device 254 and/or sensors embedded within the bow 5 and in communication with the mobile device 254 may be utilized in a manner that is similar to the manners described above in connection with generating graphics, updating the generated graphic, determination of whether the simulated arrow 282 was fired, and the flight path of the arrow 282. The primary difference is in this embodiment, an external display is utilized instead of the mobile devices display 255.

Figure 33:
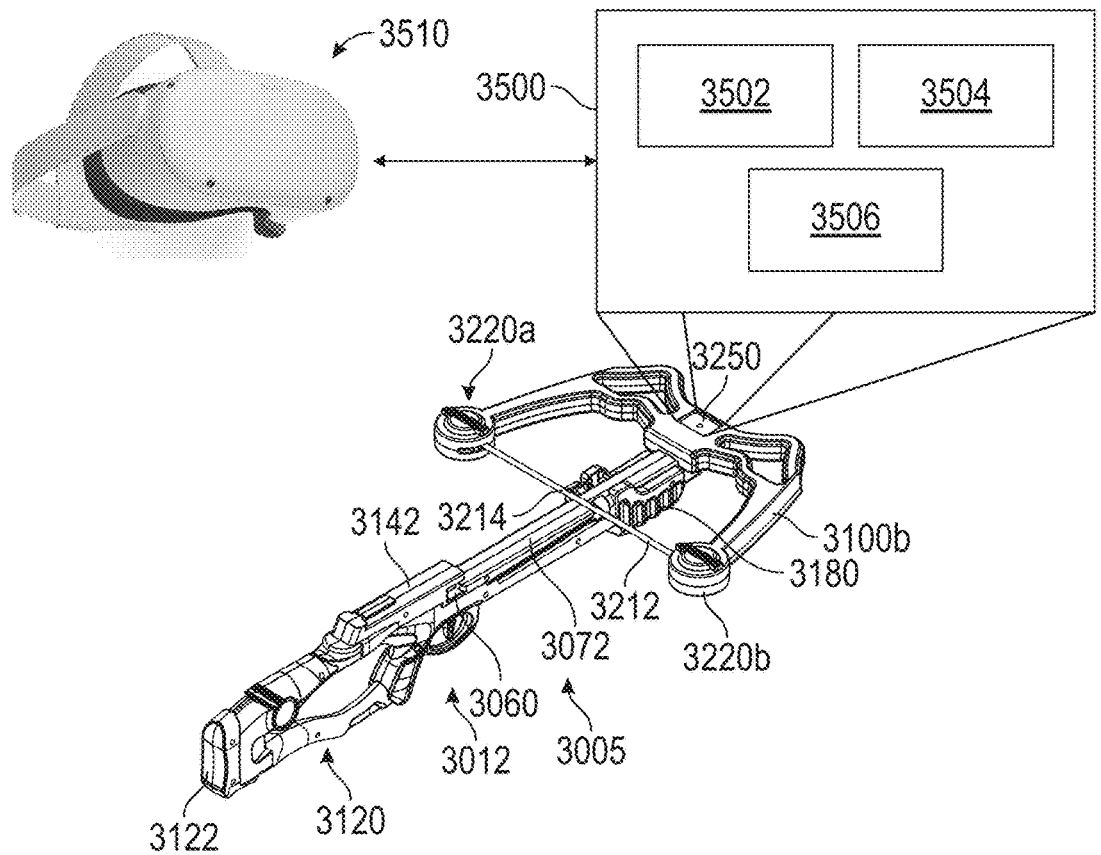
FIG. 33 is a third embodiment of the AR/VR crossbow system, which replaces the electronic device assembly with an integrated circuit configured to communicate with the headset.

FIG. 33 shows a fourth embodiment of the crossbow 3005. For sake of brevity, the above disclosure in connection with crossbow 5 will not be repeated below, but it should be understood that across embodiments like numbers that are separated by 3000 represent like structures. In this embodiment, the mobile device 254 in the AR/VR crossbow system 248 may be removed from the bow 10. In this embodiment, a sensor 3500 is connected to the bow 10 via a mount port 250. This integrated circuit 3500 contains at least a wireless module (e.g., Bluetooth) 3502, a movement sensor (e.g., gyroscope or magnetometer) 3504, and a means for detecting the firing of the arrow (e.g., using a sensor) 3506. Here, the movement sensor 3504 will detect the position of the bow 10 and this information will be communicated wirelessly, via the wireless module 3502, to the mobile device 254 contained in a headset. The mobile device 254 will be positioned within a virtual reality headset, such as Google Cardbord, Merge VR Goggles, Carl Zeiss VR One Plus, Xiaomi Play2, and like models. This embodiment will uses similar mechanics of how the graphics are updated, the determination of whether a simulated arrow 282 was fired, and the flight path of the arrow 282, as described above. The primary difference is in this embodiment, an external set of sensors and modules 3500 are used instead of the sensors and modules contained within the user's mobile device 254.

In a further embodiment, the mobile device 254 in the AR/VR crossbow system 248 is completely replaced by a combination of an integrated circuit 3500 that is coupled to the bow 10 and an external processing unit. The external processing unit may be a video game console (e.g., PlayStation or Xbox) or a computer. In this embodiment, the integrated circuit 3500 is connected to the bow 10 via a mount port 250. This integrated circuit 3500 contains at least a wireless module (e.g., Bluetooth) 3502, a movement sensor (e.g., gyroscope or magnetometer) 3504, and a means for detecting the firing of the arrow (e.g., using a sensor) 3506. Other modules may be contained within the integrated circuit 3500 (e.g., optical light source). Here, the movement sensor 3504 will detect the position of the bow 10 and this information will be communicated wirelessly, via the wireless module 3502, to the external processing unit. The external processing unit will be in communication, preferably wireless communication, with a headset 3510. Such headsets 3510 include: Sony PlayStation VR headset, HTC Vive, and Oculus Rift. This embodiment will uses similar mechanics of how the graphics are updated, the determination of whether a simulated arrow 282 was fired, and the flight path of the arrow 282, as described above. The primary difference is in this embodiment, an external processing unit is processing all of the information and a set of an external set of sensors and modules are used instead of the sensors and modules contained within the user's mobile device 254.

Figure 34:
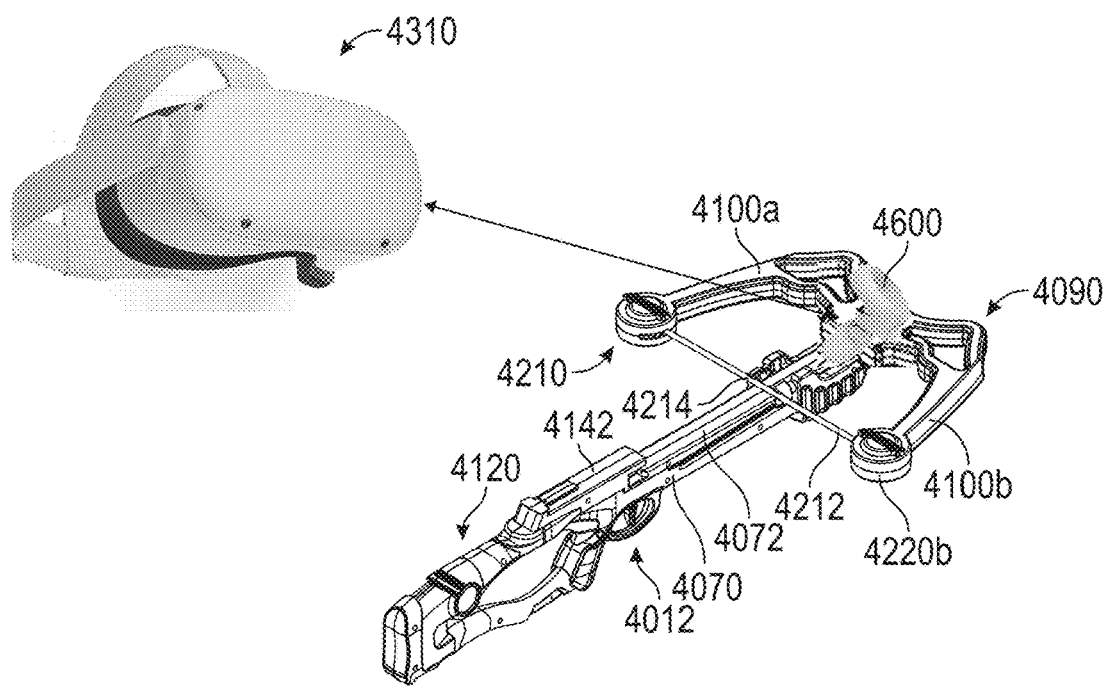
FIG. 34 is a fourth embodiment of the AR/VR crossbow system, which replaces the electronic device assembly with a controller configured to communicate with the headset.

FIG. 34 shows a fifth embodiment of the crossbow 4005. For sake of brevity, the above disclosure in connection with crossbow 5 will not be repeated below, but it should be understood that across embodiments like numbers that are separated by 4000 represent like structures. In this embodiment, the mobile device 254 in the AR/VR crossbow system 248 is completely replaced by a controller 4600 associated with an external processing unit (e.g., video game console (PlayStation or Xbox) or a computer). In this embodiment, the controller 4600 is connected to the bow 10 via a mount port 250. This controller 4600 contains at least a wireless module (e.g., Bluetooth) and a movement sensor (e.g., gyroscope or magnetometer). Other modules may be contained within the sensors (e.g., optical light source). Here, the movement sensor will detect the position of the bow 10 and this information will be communicated wirelessly, via the wireless module, to the external processing unit. The external processing unit will be in communication, preferably wireless communication, with a headset 4610. Such headsets 4610 include: Sony PlayStation VR headset, HTC Vive, and Oculus Rift. This embodiment will uses similar mechanics of how the graphics are updated, the determination of whether a simulated arrow 282 was fired, and the flight path of the arrow 282, as described above. The primary difference is in this embodiment, an external processing unit is processing all of the information and a controller associated with an external processing unit is used instead of the sensors and modules contained within the user's mobile device 254.

FIGS. 35-39 show an extent of a sixth embodiment of a crossbow 5005. For sake of brevity, the above disclosure in connection with crossbow 5 will not be repeated below, but it should be understood that across embodiments like numbers that are separated by 5000 represent like structures. This embodiment includes a tension adjustment mechanism 5170 that is configured to vary the tension of the resistance element 5212 between its first end 5104 and second end 5152. In an embodiment, the user 2 can vary the tension of the resistance element 5212 by manipulating the adjustable tension mechanism 5170. In particular, the user 2 can vary the tension of the resistance element 5212 by grasping a handle 5164 formed on the external surface of the second housing cover 5140 and rotating the second housing cover 5140 relative to the second housing 5136.

Referring to FIGS. 35-39, the adjustment mechanism 5170 includes a cover piece 5174, a bolt 5178, a washer 5182, a ratchet wheel 5186 and means for restricting undesired rotation 5200. The rotation restricting means 5200 is configured as a ring 5202, washer or spacer. The bolt 5178 extends through the washer 5182 and a second housing aperture 5184 and threadably connects to a ratchet wheel 5186 positioned within the second housing 5136. Referring to FIGS. 35-39, the bolt 5178 threadably attaches to a nut 5185 embedded in the ratchet wheel 5186. The ratchet wheel 5186 includes a plurality of teeth 5190 arranged along the outer periphery of the ratchet wheel 5186. Fasteners 5194, such as screws or pins, extend through wheel apertures 5196 and attach to the second housing cover 5140 via the boss 5158, such that the ratchet wheel 5186 rotates with the second housing cover 5140 when it is actuated by the user 2. Further, the securing of the ratchet wheel 5186 with the boss 5158 assists in securing the second securing element 5148 and the resistance element second end 5152 within the second receptacle 5160. The ring 5202 is disposed within a circumferential track 5204 formed in an internal wall of the second housing 5136. The ring 5202 is relatively thin metal object with a wavy, non-planar configuration. The ring 5202 is further disposed between the second housing 5136 and the ratchet wheel 5186, whereby the ring 5202 serves to frictionally limit rotation between the second housing 5136 and the second housing cover 5140 by imparting a frictional force on the ratchet wheel 5186 and/or the second housing 5136.

Figure 38:
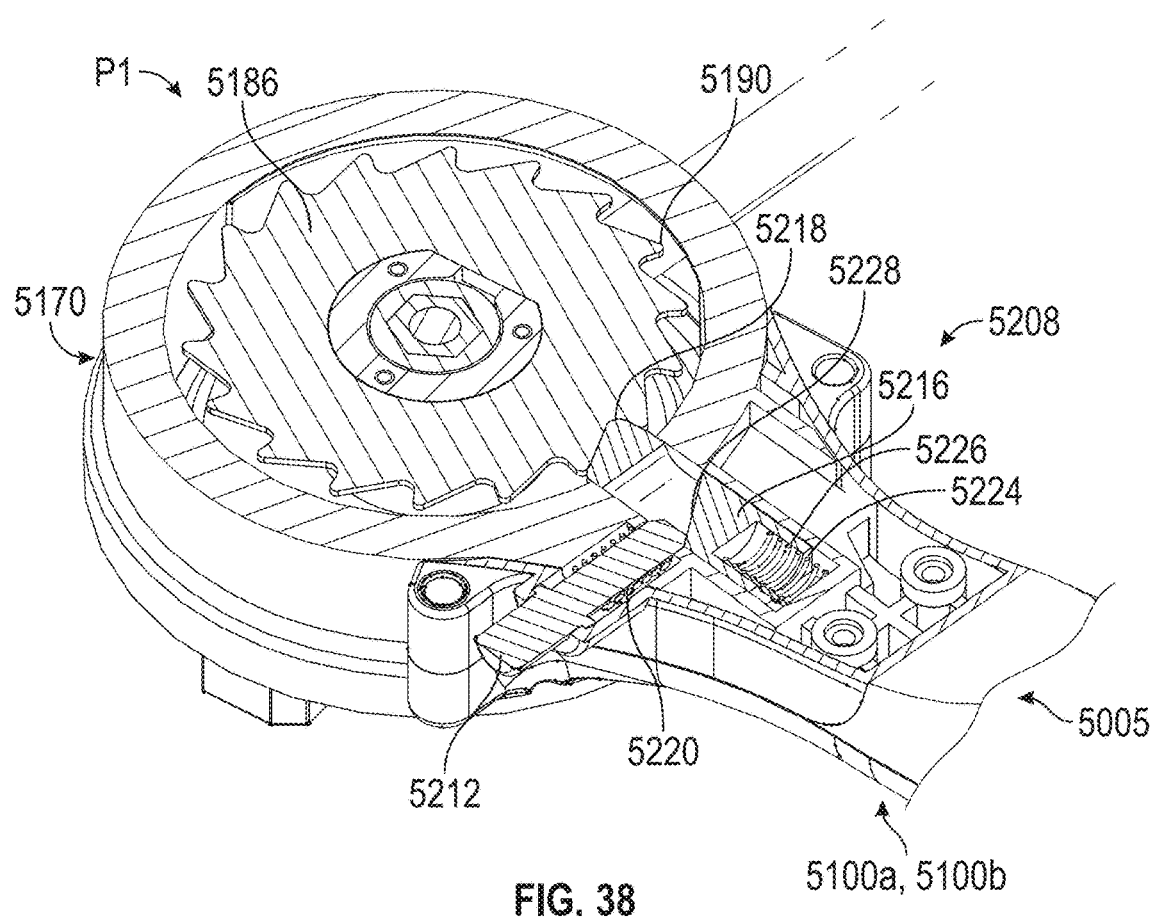
FIG. 38 shows the tension adjustment mechanism of the fifth embodiment of the AR/VR crossbow system of FIG. 35 in a released position.
Figure 39:
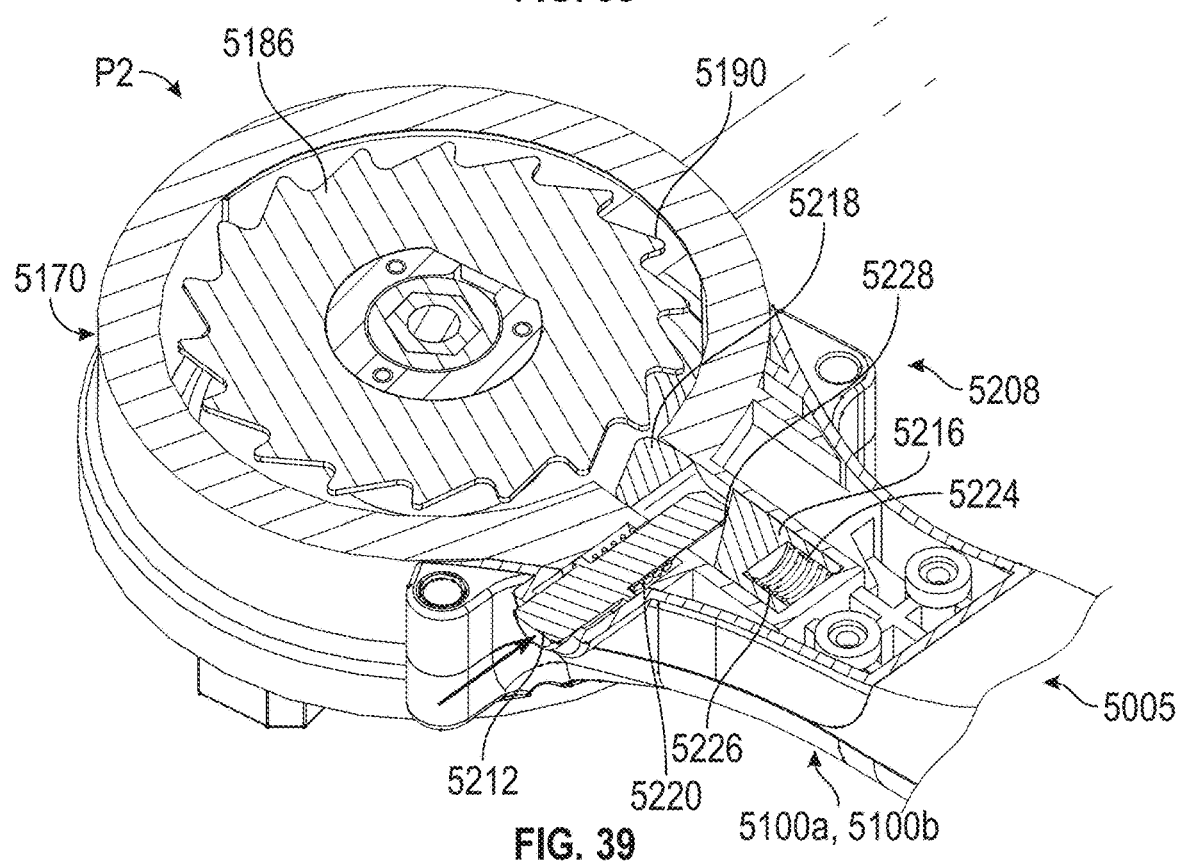
FIG. 39 shows the tension adjustment mechanism of the fifth embodiment of the AR/VR crossbow system of FIG. 35 in an engaged position.

The adjustment mechanism 5170 further includes a release mechanism 5208 positioned adjacent the second housing 5136 in a neck region 5047 of the limb 5100*a*, 5100*b* of the bow frame assembly 5010. The adjustment mechanism 5170 comprises an actuator 5212, a pawl 5216, a coil spring 5220 that receives an extent of the actuator 5212 and a coil spring 5224 that resides substantially within pawl 5216. The pawl 5216 is moveable between an engaged positions P1 (see FIG. 38) and a released position P2 (see FIG. 39), the latter causing a tip 5218 of the pawl 5216 to be engaged with the teeth 5190 of the ratchet wheel 5186. When the pawl 5216 is in the engaged position P1, as illustrated in FIG. 38, the ratchet wheel 5186 is rotatable in one direction (e.g., counter-clockwise) but not in another direction (e.g., clockwise). This rotational aspect corresponds to the ratchet wheel 5186 being rotatable in a direction that increases the tension in the resistance element 5212 while not being rotatable in a direction that decreases the tension in the resistance element 5212. When the pawl 5216 is in the released position P2, as illustrated in FIG. 39, the ratchet wheel 5186 is rotatable in both directions (e.g., counter-clockwise and clockwise). The actuator 5212, configured as a depressible button, is biased away from the pawl 5216 by the spring 5220, while the pawl 5216 is biased towards the ratchet wheel 5186 and the engaged position P1 by the pawl spring 5224, which resides within a cavity 5226 formed in the neck region 5047 of the limb 5100*a*, 5100*b*. In operation, the user 2 depresses the actuator 5212 inward and toward the pawl 5216 in the direction shown by the arrow in FIG. 39. The actuator 5212 acts on an inclined surface 5228 of the pawl 5216 and thereby moves the pawl 5216 into the released position. The release mechanism 5208, and components thereof, are secured and contained in the limb 5100a, 5100b by a release cover 5232. When the user 2 removes pressure from the actuator 5212, the actuator 5212 moves away from the pawl 5216 and the pawl 5216 moves towards and into contact with the ratchet wheel 5186 and the adjustment mechanism 5170 returns to the engaged position P1 of FIG. 38.

Figure 35:
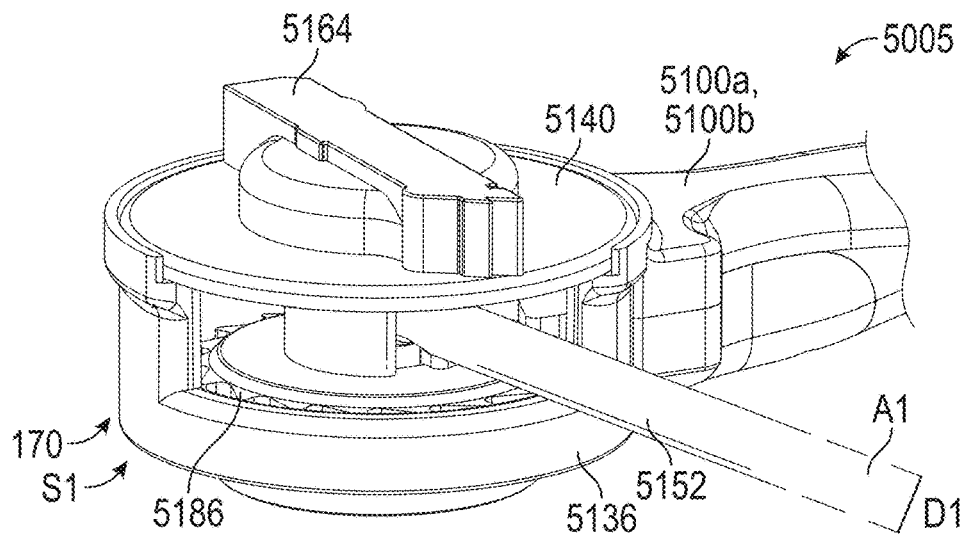
FIG. 35 is a fifth embodiment of the AR/VR crossbow system, which includes a tension adjustment mechanism in a first state.
Figure 36:
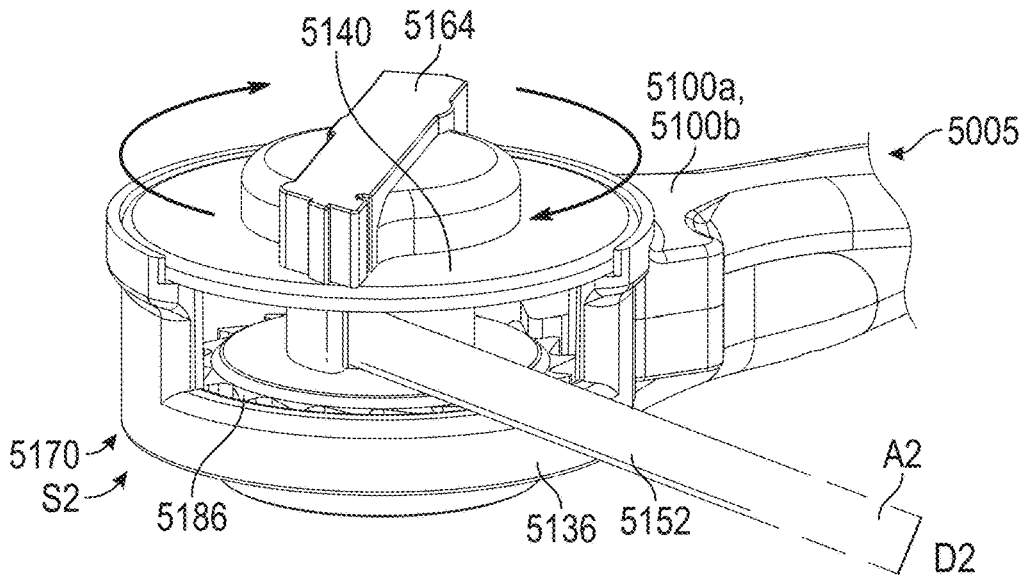
FIG. 36 shows the tension adjustment mechanism of the fifth embodiment of the AR/VR crossbow system of FIG. 35 in a second state.
Figure 37:
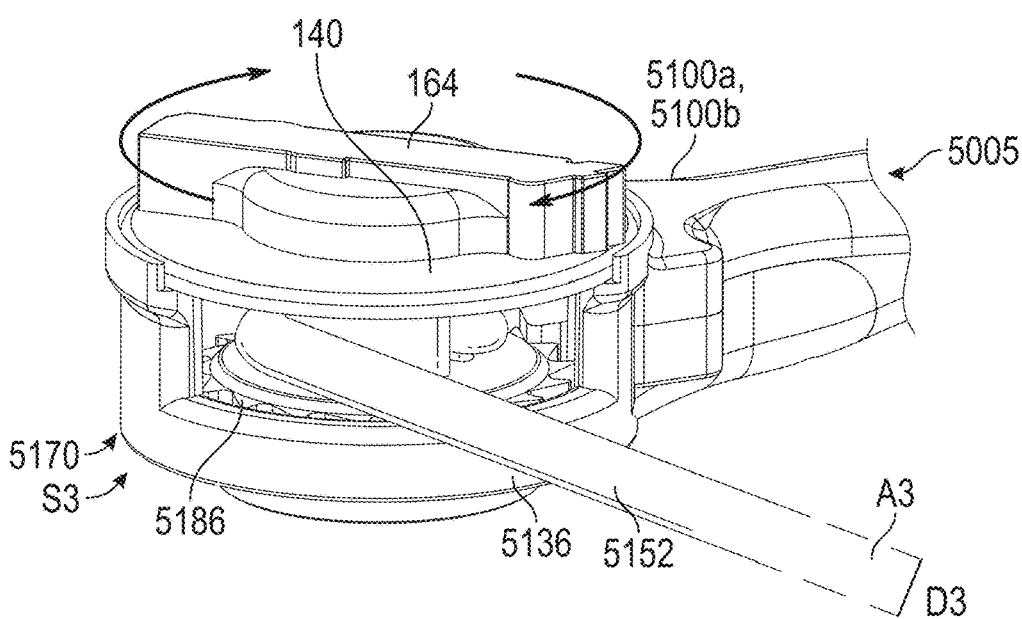
FIG. 37 shows the tension adjustment mechanism of the fifth embodiment of the AR/VR crossbow system of FIG. 35 in a third state.

FIGS. 35-37 illustrate embodiments of first, second and third states, respectively, of the tension adjustment mechanism 5170 and the resistance element 5212, focusing on the second end 5152 of the resistance element 5212. The various states impact the draw weight of the element 5212, which is a measure of the force needed to pull the resistance element 5212 from the initial position (see FIG. 7) to the drawn position P2 (see FIGS. 13-16). FIG. 35 shows the adjustment mechanism 5170 and the resistance element 5212 in a first state of tension S1. FIG. 36 shows the adjustment mechanism 5170 and the resistance element 5212 in a second state of tension S2 which places the element 5212 in greater tension than that of the first tension state S1. Additionally, the draw weight of the resistance element 5212 in the second state S2 is greater than the draw weight of the resistance element 5212 in the first state S1. Further, a cross-sectional area A2 and a cross-sectional diameter D2 of the resistance element 5212 in the second state S2 is less than a cross-sectional area A1 and a cross-sectional diameter D1 of the resistance element 5212 in the first state S1. The user 2 can grasp and actuate the handle 5164 to rotate the second housing cover 5140 relative to the second housing 5136, which selectively increases the tension and draw weight of the resistance element 5212. Actuating the handle 5164 in the clockwise direction causes the second end of the resistance element 5152 to progressively wrap around the second bead receptacle 5160 and the boss 5158 of the second housing cover 5140 and within the second housing cavity 5144, thereby increasing the tension between the opposed ends of the element 5212 and its draw weight. The user 2 rotates the handle 5164 in a clockwise direction shown by the arrow in FIG. 36 to increase the tension of the resistance element 5212 and move from the first state S1 to the second state S2.

FIG. 36 shows the resistance element 5212 and the adjustment mechanism 5170 in a third state of tension S3 which the user 2 has selectively arrived at by further actuating the handle 5164. In the third state S3, the element 5212 is in greater tension than that of the first or second states S1, S2. Also, the draw weight of the resistance element 5212 in the third state S3 is greater than the draw weight in either the first or second states S1, S2. Further, a cross-sectional area A3 and a cross-sectional diameter D3 of the resistance element 5212 in the third state is less than cross-sectional areas A1 and A2, as well as cross-sectional diameter D1 and D2 of the resistance element 5212. Thus, the cross-sectional area A of and cross-sectional diameter D of the resistance element 5212 vary inversely with the tension of the resistance element 5212. As the tension of the resistance element 5212 increases, the cross-sectional areas and diameters decrease, and as the tension of the resistance element 5212 decrease, the cross-sectional areas and diameters increase.

The user 2 can grasp and actuate the handle 5164 to rotate the second housing cover 5140 relative to the second housing 5136 in the manner described above. Further actuating the handle 5164 in the clockwise direction causes a greater extent of the second end of the resistance element 5152 to progressively wrap around the second bead receptacle 5160 and the boss 5158 of the second housing cover 5140 and within the second housing cavity 5144, thereby further increasing the tension between the opposed ends of the element 5212 and its draw weight. The user 2 rotates the handle 5164 in a clockwise direction shown by the arrow in FIG. 37 to increase the tension of the resistance element 5212 and move the second state S2 to the third state S3.

As explained above, the user 2 can actuate the handle 5164 of the adjustment mechanism 5170 to move the resistance element 5212 from the first state S1 to the second state S2 to the third states S3 regardless of the relative position of the pawl 5216 and the ratchet wheel 5186. However, the engagement between the pawl 5216 and the teeth 5190 of the ratchet wheel 5186 precludes decreasing the tension in the resistance element 5212 and moving from the third state S3 to either the second state S2 or the first state S1. To decrease the tension in the resistance element 5212 and move from the third state S3 to either the second state S2 or the first state S1, the user 2 depresses the actuator 5212 to move the pawl 5216 to the released position P2 (see FIG. 39) and turns the handle 5164 in the counter-clockwise direction which rotates the second housing cover 5150 relative to the second housing 5136. This rotation causes an extent of the second end of the resistance element 5152 to progressively un-wrap, or unwind, from the second bead receptacle 5160 and the boss 5158 of the second housing cover 5140, whereby the tension in the resistance element 5212 is decreased.

When the user 2 wants to decrease the tension in the resistance element 5212 and depresses the actuator 5212 to move the pawl 5216 to the released position P2 as part of the process of reducing the tension, the ring 5202 prevents rapid unwinding of the second end of the resistance element 5152 from the boss 5158 by exerting an internal retaining force on the ratchet wheel 5186 that is only overcome by the user 2 physically actuating the handle 5164. In this manner, the rotation restricting means 5200, for instance the ring 5202, frictionally reduces a relative rotation rate of the ratchet wheel 5186. Therefore, until the user 2 depresses the actuator 5212 and physically actuates the handle 5164, the ring 5202 prevents unwanted rotation of the ratchet wheel 5186 that would lead to a rapid unwinding of the second end 5152 and a reduction in the tension of the resistance element 5212. Alternatively, the rotation restricting means 5200, including the ring 5202, can be configured to apply a lesser internal retaining force on the ratchet wheel 5186 when the user 2 depresses the actuator 5212 whereby the wheel 5186 rotates slowly and the second end 5152 unwinds slowly from the boss 5158 in a steady, controlled manner that does not require physical actuation of the handle 5164. In this configuration, actuation of the handle 5164 by the user 2 could increase the speed at which the second end 5152 unwinds and the reduction in the tension of the resistance element 5212.

It is further contemplated that the resistance element 5212 is replaceable by removing elements of the adjustable tension mechanism 5170 and the first housing cover 5112 for maintenance or for installing resistance elements 5212 with different mechanical properties or dimensions (e.g., replacing a first element 5212 with a thicker, second element 5212 to provide even greater draw weight). Additionally, in a non-limiting embodiment, the tension or resistance of the resistance element 5212 is adjustable between 10 and 70 pounds by the user 2 via the adjustable tension mechanism 5170. Elements and components of the crossbow 10, as described above, can be formed from any number of materials, including metals, alloys, polymers, ceramics and composite materials, including plastics and carbon fiber-reinforced polymers.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. An AR/VR crossbow system that is incapable of firing real arrows but that simulates real-life crossbow scenarios that an archer may face during an archery competition or a hunt, the AR/VR crossbow system comprising:
a crossbow frame assembly including:
a central member with (i) a rail, (ii) a trigger assembly, (iii) a frontal frame assembly having opposed left and right limbs that extend outward from the frontal frame assembly, and (iv) a cocking assembly;
a serving receiver;
a resistance assembly operably connected to the left and right limbs, the resistance assembly including a resistance element with a serving segment, wherein an extent of the serving segment is received within the serving receiver in a cocked state of the crossbow system or a ready to fire state of the crossbow system;
an electronic device assembly including a mobile device; and,
wherein the trigger assembly is designed to allow the archer to: (i) release the resistance assembly from a drawn position, (ii) move the crossbow system from the ready to fire state to a fired state, and (iii) fire a simulated arrow on the mobile device.

2. The AR/VR crossbow system of claim 1, wherein the trigger assembly includes: (i) a trigger, (ii) a trigger guard, and (iii) an actuator, and wherein the trigger:
is configured to interact with the archer and includes: (a) a main body, (b) a downwardly extending projection with a contact surface, and (c) an upwardly extending projection with an interactive surface, and
is designed to pivot about a trigger pivot pin received in an extent of the main body, while being biased by a trigger spring.

3. The AR/VR crossbow system of claim 2, wherein the actuator is positioned above the trigger and is configured to interact with the trigger and the serving segment of the resistance element.

4. The AR/VR crossbow system of claim 2, wherein the actuator includes: (i) a main body having a serving engagement surface, and (ii) an actuator projection having a trigger engagement surface.

5. The AR/VR crossbow system of claim 4, wherein when a sufficient amount of force is applied by the trigger, the actuator pivots about the actuator pivot pin while being biased by an actuator spring.

6. The AR/VR crossbow system of claim 1, wherein the serving receiver is a receptacle formed between (i) the trigger assembly, (ii) a serving retention element formed from the central member, and (iii) a frontal extent of a sight assembly affixed to an upper portion of the central member.

7. The AR/VR crossbow system of claim 1, wherein the central member has an upper surface that includes the rail, and a cocking assembly channel that receives an extent of the cocking assembly.

8. The AR/VR crossbow system of claim 7, wherein the cocking assembly channel is a recess formed in opposed side walls of the central member.

9. The AR/VR crossbow system of claim 7, wherein said received extent of the cocking assembly is positioned within the cocking assembly channel whereby said received extent of the cocking assembly is slidingly displaced along an extent of the cocking assembly channel when the crossbow system is moved between various states of operation.

10. The AR/VR crossbow system of claim 7, wherein the cocking assembly channel is disposed at an angle alpha a in relation to the rail of the central member of the crossbow frame assembly, and wherein the angle alpha a is between 0.1° and 5°.

11. The AR/VR crossbow system of claim 1, wherein the frontal frame assembly is coupled to a frontal extent of the central member and includes: (i) a riser with a mount port configured to receive an electronic device assembly with a mobile device, and (ii) opposed left and right limbs that extend outward from the central member.

12. The AR/VR crossbow system of claim 11, wherein the riser abuts the cocking assembly when the crossbow is in the ready to fire state or the fired state.

13. The AR/VR crossbow system of claim 12, wherein the riser includes a mount port for the mobile device that is positioned in a central portion of the riser, whereby the mobile device is aligned with a sight assembly affixed to an upper portion of the central member such that the archer can view the mobile device through the sight assembly during operation of the crossbow system.

14. The AR/VR crossbow system of claim 13, wherein the sight assembly includes: (i) a sight rail, and (ii) a sight, wherein the sight assembly is configured to allow the archer to focus on the mobile device during operation of the crossbow system.

15. The AR/VR crossbow system of claim 1, wherein the cocking assembly is slidingly displaced along the central member to move the crossbow system from a ready to use state, to the cocked state, and then to a ready to fire state.

16. The AR/VR crossbow system of claim 1, wherein the cocking assembly is slidingly displaced along the central member to move the resistance assembly from an undrawn position to the drawn position.

17. The AR/VR crossbow system of claim 16, wherein the cocking assembly includes (i) a hand grip having left and right members that are coupled together by at least one connecting element, and (ii) a cradle having a first cradle element and a second cradle element, both of which engage the resistance assembly under certain operating conditions.

18. The AR/VR crossbow system of claim 17, wherein the central member has an upper surface that includes the rail, and a cocking assembly channel that receives an extent of the cocking assembly, and
    wherein said connecting element is positioned substantially within the cocking assembly channel to allow the hand grip to slide downward and rearward within the cocking assembly channel and in relation to the rail and the frontal frame assembly.

19. The AR/VR crossbow system of claim 18, wherein during movement from a ready to use state to the cocked state, said downward and rearward sliding movement of the hand grip within the cocking assembly channel causes the cradle to apply a downwardly directed force F to the serving segment of the resistance element to force the serving into the serving receiver.

20. The AR/VR crossbow system of claim 1, wherein the serving segment is positioned between a first portion of the resistance element and a second portion of the resistance element.

21. The AR/VR crossbow system of claim 1, wherein a first portion of the resistance element includes a first securing element operably connected to a left securement housing affixed to the left limb, and a second portion of the resistance element includes a second securing element operably connected to a right securement housing affixed to the right limb.

22. The AR/VR crossbow system of claim 1, wherein the cocking assembly includes (i) a hand grip having left and right members that are coupled together by at least one connecting element, and (ii) a cradle that engages the resistance assembly under certain operating conditions; and
    wherein when the AR/VR crossbow system is in a ready to use state: (i) a hand grip of the cocking assembly is in a forward position, and (ii) the resistance element is in an undrawn position.

23. The AR/VR crossbow system of claim 22, wherein the trigger assembly includes: (i) a trigger, (ii) a trigger guard, (iii) a trigger spring, and (iv) an actuator having: (a) a main body with a serving engagement surface, (b) an actuator spring and (c) an actuator projection having a trigger engagement surface; and,
    wherein in the ready to use state, the trigger assembly is in a first position where the actuator spring and the trigger spring apply biasing forces on the trigger and the actuator in order to cause the serving engagement surface to be parallel with the rail of the central member.

24. The AR/VR crossbow system of claim 1, wherein a crossbow application is loaded on the mobile device, and wherein the crossbow application simulates real life archery scenarios.

* * * * *